United States Patent [19]

Nonaka

[11] Patent Number: 5,797,371

[45] Date of Patent: Aug. 25, 1998

[54] CYLINDER-DISABLING CONTROL SYSTEM FOR MULTI-CYLINDER ENGINE

[75] Inventor: Kimihiro Nonaka, Hamamatsu, Japan

[73] Assignee: Sanshin Kogyo Kabushiki Kaisha, Hamamatsu, Japan

[21] Appl. No.: 613,890

[22] Filed: Mar. 11, 1996

[51] Int. Cl.⁶ .................................................. F02D 17/02
[52] U.S. Cl. ............................ 123/481; 123/406; 440/84
[58] Field of Search ................................. 123/406, 417, 123/481, 198 F; 440/84, 87

[56] References Cited

U.S. PATENT DOCUMENTS

| | | | |
|---|---|---|---|
| 4,991,558 | 2/1991 | Daly et al. | 123/481 |
| 5,374,224 | 12/1994 | Huffmaster et al. | 123/417 |
| 5,408,974 | 4/1995 | Lipinski et al. | 123/481 |
| 5,540,633 | 7/1996 | Yamanaka et al. | 123/198 F |
| 5,579,736 | 12/1996 | Nakamura et al. | 123/481 |
| 5,584,266 | 12/1996 | Motose et al. | 123/198 F |

*Primary Examiner*—Andrew M. Dolinar
*Attorney, Agent, or Firm*—Knobbe, Martens, Olson & Bear LLP

[57] ABSTRACT

A cylinder-disabling control system for a multi-cylinder engine provided with an exhaust manifold to which each exhaust port is connected, which control system comprises an engine performance sensor, an operation mode selector for selecting the cylinder-disabling mode or the all-cylinders-engaged mode, depending on the engine performance, and a resuming controller for resuming the disabled cylinders one at a time when switching from the cylinder-disabling mode to the all-cylinders-engaged mode, thereby allowing for continuous and smooth switching between the cylinder-disabling mode and the all-cylinders-engaged mode.

21 Claims, 23 Drawing Sheets

P Bank    S Bank

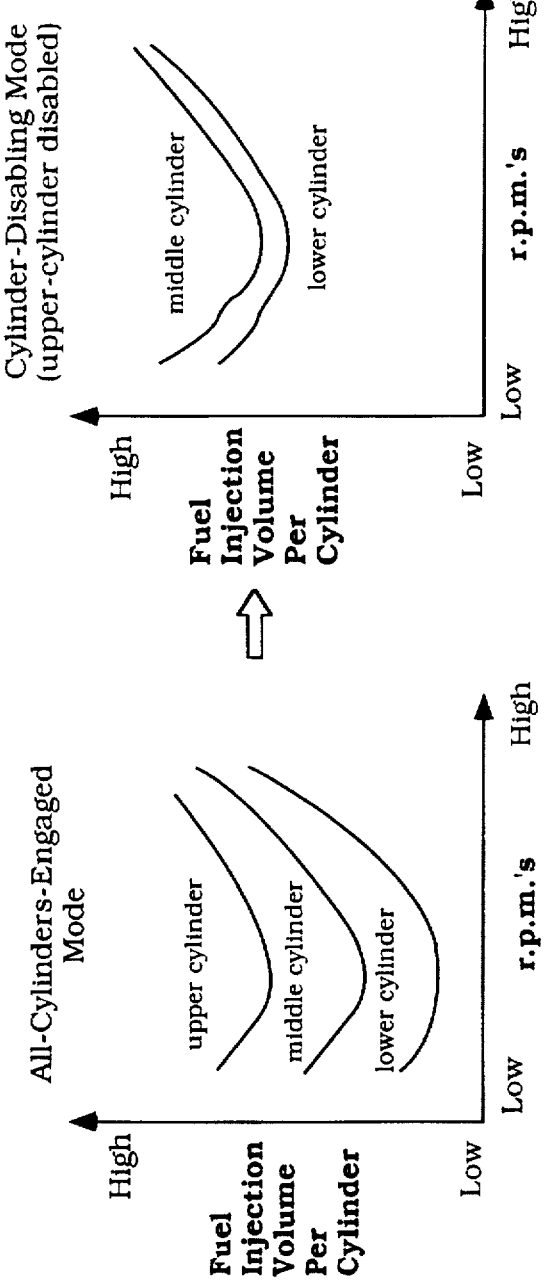
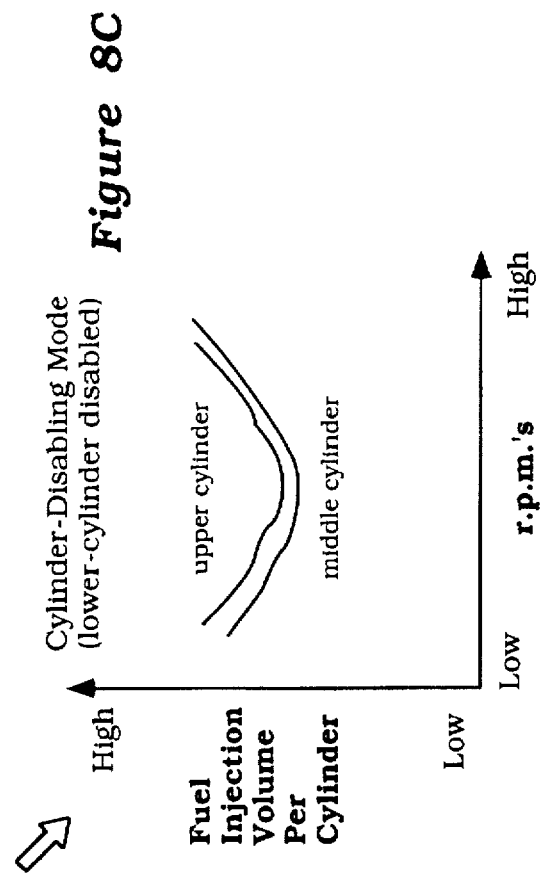
*Figure 8A*
*Figure 8B*
*Figure 8C*

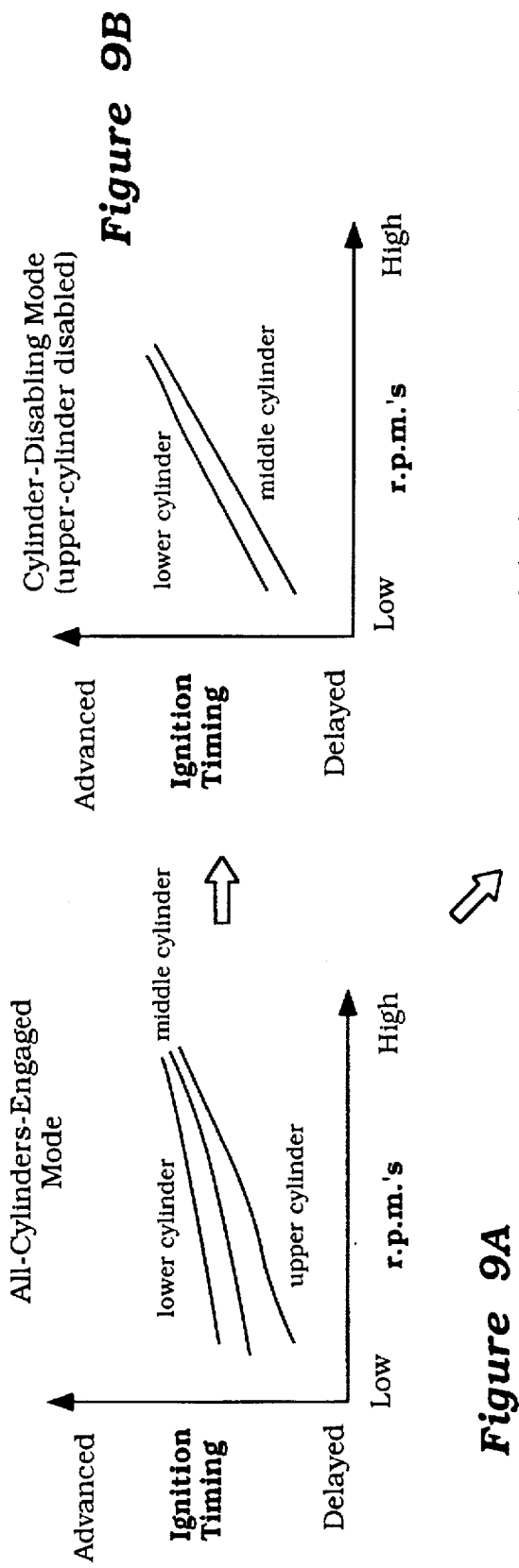

4-Cylinder Operation
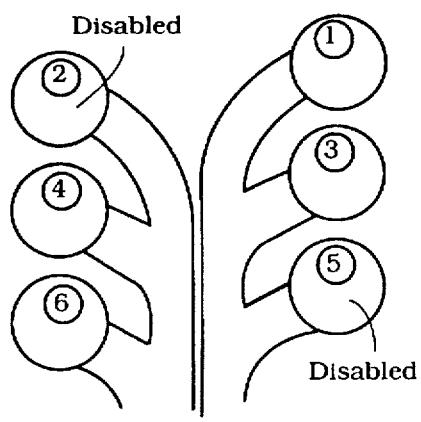
6-Cylinder Operation
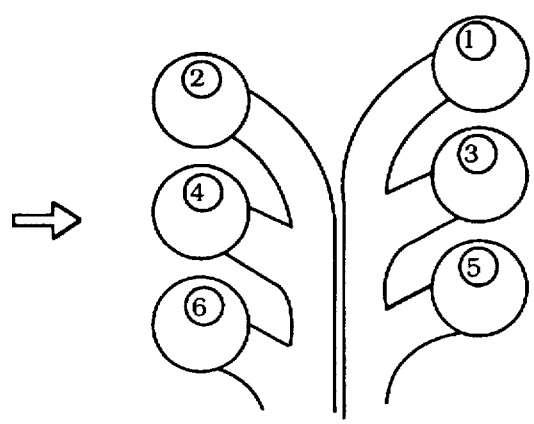
Figure 18A
Figure 18B

CYLINDER-DISABLING CONTROL SYSTEM FOR MULTI-CYLINDER ENGINE

BACKGROUND OF INVENTION

This invention relates to a cylinder-disabling control system for a multi-cylinder engine, especially that of a two-cycle engine, and more particularly to that allowing for continuous and smooth transition between the cylinder-disabling mode and the all-cylinders-engaged mode. This invention also relates to a method therefor.

Engines, especially two-cycle engines, involves drawbacks in that scavenging exhaust gas is not sufficient when driving at a low speed or with a low load, whereby exhaust gas is not fully expelled, and irregular combustion is likely to occur, leading to unstable engine revolutions.

A method is available for improving unstable engine revolutions. That is, a cylinder-disabling mode, in which at least one but not all of the cylinders are disabled so as to reduce the number of operating cylinders, is employed. By reducing the number of operating cylinders, it is possible to obtain the effects in that exhaust gas pressure (back pressure) in an exhaust system is reduced, and exhaust interference interfering with discharging exhaust gas and introduction of a scavenging stream is inhibited due to transmission of exhaust pulses, leading to an increase in intake volume per cylinder, thereby stabilizing the engine revolutions.

However, when the all-cylinders-engaged mode is resumed from the cylinder-disabling mode, depending on the selected cylinder(s) to be resumed, injection gas volume when resumed, and timing control of ignition, impact occurs in association with an increase in the number of operating cylinders, and engine noise (or rpm's) changes, meaning that continuous and smooth transition between the cylinder-disabling mode and the all-cylinders-engaged mode will suffer. Particularly for a multi-cylinder engine provided with an exhaust manifold to which each exhaust port is connected, the above described control, i.e., selection of cylinders to be resumed, injection gas volume when resumed, and timing control of ignition, must be conducted by taking into consideration the particular characteristics of the multi-cylinder engine with an exhaust manifold.

SUMMARY OF THE INVENTION

The present invention has exploited a cylinder-disabling control system. A principle object of this invention is to provide a cylinder-disabling control system for a multi-cylinder engine, especially with an exhaust manifold, which allows for continuous and smooth transition between the cylinder-disabling mode and the all-cylinders-engaged mode.

Namely, one important aspect of the present invention is a cylinder-disabling control system for a multi-cylinder engine provided with an exhaust manifold to which each exhaust port is connected, said control system comprising: an engine performance sensor for sensing the engine performance; an operation mode selector for selecting either a cylinder-disabling mode in which at least one but not all of the cylinders are disabled, or an all-cylinders-engaged mode in which all of the cylinders are operated, depending on the engine performance; and a resumption controller for resuming cylinder operation by resuming operation of said at least one disabled cylinder one at a time, when switching from the cylinder-disabling mode to the all-cylinders-engaged mode. Heretofore, combustion disturbances have been likely, especially in a two-cycle engine having an exhaust manifold, when the number of operating cylinders is increased, because the injection fuel volume and the ignition timing widely fluctuate not only while resuming operation of cylinders from the disabled stage but also while operating cylinders. According to the above control system of the present invention, by increasing the number of operating cylinders one at a time, it is possible to prevent impact occurring in association with an increase in the number of operating cylinders, and prevent increasing engine rpm's and engine noise, thereby allowing for continuous and smooth switching between the cylinder-disabling mode and the all-cylinders-engaged mode.

In the above system, said resuming controller is preferably a controller for a V-type engine having plural cylinders on each of two banks, said plural cylinders being connected to the respective exhaust manifolds, said controller resuming operation of said at least one disabled cylinder in sequence alternately between the two banks. By increasing the number of operating cylinders in sequence alternately between the two banks, it is possible to balance the change in combustion of each bank, thereby facilitating continuous and smooth transition.

In the aforesaid system, said resuming controller is preferably a controller which resumes operation of said at least one disabled cylinder in sequence from the most downstream disabled cylinder; exhaust pulses are transmitted through cylinders from an upstream cylinder to a downstream cylinder. Heretofore, intense combustion has been likely to occur in downstream cylinders when operation of cylinders is resumed, because the direction of exhaust pulses and that of exhaust gas flow are the same, and accordingly, exhaust gas volume remaining in the cylinders is high. By resuming the operation of cylinders in sequence from the most downstream disabled cylinder, it is possible to prevent disturbing the transition due to intense combustion when the number of operating cylinders is increased.

In the aforesaid system, said resuming controller is preferably a controller for an engine for a hydroplaning vehicle, said controller resuming at least partial operation of said at least one disabled cylinder when the engine is in water-sliding (planing) transition. During water-sliding transition, a change in position of a hull is large so that a change in engine r.p.m's and engine noise due to the change in the number of operating cylinders may not be perceived. Thus, by resuming at least partial operation of the disabled cylinder(s) during water-sliding (planing) transition, it is possible to facilitate continuous and smooth transition.

Another important aspect of the present invention is a cylinder-disabling control system for a multi-cylinder engine, said control system comprising: an engine performance sensor for sensing the engine performance; an operation mode selector for selecting either a cylinder-disabling mode in which at least one but not all of the cylinders are disabled, or an all-cylinders-engaged mode in which all of the cylinders are engaged, depending on the engine performance; and an engine revolution controller for controlling engine rpm's in such a way that the rpm's of the engine immediately after the number of operated cylinders is increased while maintaining a constant throttle angle, are lower than those immediately before the number of operated cylinders is increased. Heretofore, even when the engine rpm's remain the same, an increase in engine rpm's has been likely to be perceived when the number of operating cylinders is increased since the number of firing is increased. By reducing the rpm's of the engine immediately after the number of operated cylinders while maintaining a constant throttle angle, to a value lower than that immediately before the number of operated cylinders is increased, i.e., the engine rpm's are reduced after the number of operating cylinders is increased, it is possible to prevent the illusory feeling of increasing engine rpm's, thereby facilitating continuous and smooth transition.

Still another important aspect of the present invention is a cylinder-disabling control system for a multi-cylinder engine, said control system comprising: an engine performance sensor for sensing the engine performance; an operation mode selector for selecting either a cylinder-disabling mode in which ignition of at least one but not all of the cylinders is discontinued while maintaining the fuel supply thereto, or an all-cylinders-engaged mode in which all of the cylinders are operated, depending on the engine performance; and a fuel injection controller for controlling the amount of injected fuel in such a way that the volume of injected fuel at idle rpm's of said at least one disabled cylinder during the cylinder-disabling mode is greater than that immediately before the number of operated cylinders is increased. One possible approach to facilitating the operation-resuming transition is to lower the setting for the volume fo fuel which will be injected to a designated cylinder to be resumed. However, when the fuel volume is simply reduced, fuel very slightly adheres to the wall of an inlet channel, and thus, when a throttle opens for sharp acceleration, the injected fuel first adheres to the wall, and the concentration of the fuel in the cylinder does not increase immediately, thereby diminishing accelerating capacity. In the above embodiment, by increasing the fuel volume at trolling rpm's to a level higher than the volume when resuming operation, it is possible to respond to sharp acceleration while trolling.

In the above embodiment, said fuel injection controller is preferably a controller which further controls the amount of injected fuel in such a way as to reduce gradually the volume of injected fuel to said amount immediately before the number of operated cylinders is increased in response to an increase in rpm's of the engine. In addition to the fuel volume control, by reducing the fuel volume in response to an increase in rpm's of the engine, it is possible to improve acceleration characteristics from a low speed and facilitate the transition.

Yet another important aspect of the present invention is a cylinder-disabling control system for a multi-cylinder engine, said control system comprising: an engine performance sensor for sensing the engine performance; an operation mode selector for selecting either a cylinder-disabling mode in which at least one but not all of the cylinders are disabled, or an all-cylinders-engaged mode in which all of the cylinders are operated, depending on the engine performance; and an ignition timing controller for controlling the ignition timing in such a way that ignition of the cylinder(s) reengaged when the number of the disabled cylinders is increased, starts at delayed normal ignition timing of cylinders during continuous operation, and gradually advances towards the normal ignition timing. During the continuous operation, by starting ignition of the reengaged cylinder(s) at delayed normal ignition timing of cylinders, and gradually advancing towards the normal ignition timing, it is possible to prevent intense combustion when cylinder operation is resumed, thereby facilitating the transition.

Further, another important aspect of the present invention is a cylinder-disabling control system for a multi-cylinder engine, said control system comprising: an engine performance sensor for sensing the engine performance; an operation mode selector for selecting either a cylinder-disabling mode in which at least one but not all of the cylinders are disabled, or an all-cylinders-engaged mode in which all of the cylinders are operated, depending on the engine performance; a throttle-opening sensor for sensing the throttle-opening; and a throttle-opening-dependent controller for controlling operation of the cylinders in such a way that at least one but not all of the cylinders are disabled when the throttle-opening is smaller than a first throttle-opening, and operation of at least one of the disabled cylinder(s) is resumed when a second throttle-opening is greater than the first throttle-opening. Heretofore, when switching between the cylinder-disabling mode and the all-cylinders-engaged mode based on the engine rpm's, hunting (i.e., frequently switching the modes) has been likely to occur in an outboard engine even when the throttle opening is constant, because the engine rpm's drastically fluctuate due to the impact of waves or the like. In the above embodiment, by disabling at least one but not all of the cylinders when the throttle-opening is smaller than a first throttle opening, and resuming operation of at least one of the disabled cylinder(s) when a second throttle-opening is greater than the first throttle-opening, i.e., by switching the cylinder-disabling mode and the all-cylinders-engaged mode based on the throttle opening and continuing hysteretic throttle-opening, it is possible to effectively prevent hunting.

In the above embodiment, the system preferably further comprises an engine revolution sensor for sensing the engine rpm's; an engine revolution-dependent controller for controlling operation of the cylinders in such a way that at least one but not all of the cylinders are disabled when the engine rpm's are lower than first engine rpm's, and operation of at least one of the disabled cylinder(s) is resumed when the second engine rpm's are higher than the first engine rpm's; and a selecting switch for selecting either the engine rpm-dependent controller or the throttle-opening-dependent controller, wherein hysteresis rpm's that are the difference between the first and second rpm's are set greater than hysteresis rpm's that are the difference between the engine rpm's corresponding to the first throttle-opening and to the second throttle-opening. By setting hysteresis rpm's greater than hysteresis rpm's based on the throttle-opening, it is also possible to effectively prevent hunting.

In addition, another important aspect of the present invention is a cylinder-disabling control system for a multi-cylinder engine, said control system comprising: an engine performance sensor for sensing the engine performance; an operation mode selector for selecting either a cylinder-disabling mode in which at least one but not all of the cylinders are disabled, or an all-cylinders-engaged mode in which all of the cylinders are operated, depending on the engine performance; and a disabled cylinder designator for designating at least one of the cylinders as disabled in such a way that said at least one of the cylinders is different from the disabled cylinder(s) in the previous cycle, when the cylinder-disabling mode is resumed after the cylinder-disabling mode has been released. When the cylinder-disabling mode is resumed after the cylinder-disabling mode has been released, operation is resumed by designating at least one of the cylinders different from the disabled cylinder (s) in the previous cycle, the fuel adhering to the spark plug from the cylinder-disabling mode will be burned off, thereby improving combustion stability at a low speed, reducing fuel expenses, and preventing plug foul due to fuel adhesion.

This invention is adapted to be embodied in both an engine control system and an engine management method for an internal combustion engine having a plurality of combustion chambers. This invention is effectively adaptable for two-cycle engines and four-cycle engines, especially two-cycle engines because two-cycle engines have particular scavenging characteristics.

BRIEF DESCRIPTION OF THE DRAWINGS

FIG. 1A is a schematic side view, and FIG. 1B is an A—A line cross-sectional schematic view.

FIG. 2A is a schematic cross-sectional view showing cylinders #1–#6 and exhaust pluses, and FIG. 2B is a chart showing the timing of opening and closing of each cylinder.

FIGS. 8A–8C are schematic graphs showing the relationship between the fuel injection volume and the engine rpm's with a parameter of cylinders in the cylinder-disabling mode and the all-cylinders-engaged mode of the first embodiment of the present invention; FIG. 8A shows the relationship in the all-cylinders-engaged mode, FIG. 8B shows the relationship in the upper-cylinder-disabling mode, and FIG. 8C shows the relationship in the lower-cylinder-disabling mode.

FIGS. 9A–9C are schematic graphs showing the relationship between the timing of ignition and the engine rpm's with a parameter of cylinders in the cylinder-disabling mode and the all-cylinders-engaged mode of the first embodiment of the present invention; FIG. 9A shows the relationship in the all-cylinders-engaged mode, FIG. 9B shows the relationship in the upper-cylinder-disabling mode, and FIG. 9C shows the relationship in the lower-cylinder-disabling mode.

FIG. 11A shows the case of four-cylinder operation, FIG. 11B shows the case of five-cylinder operation, and FIG. 11C shows the case of all-cylinder operation.

FIG. 14A shows the case in which the fuel volume introduced into the disabled cylinder was low, and FIG. 14B shows an embodiment of the present invention in which the fuel volume introduced into the disabled cylinder was initially increased and linearly reduced at a certain rate.

FIGS. 18A and 18B are a schematic illustration showing switching procedures from four-cylinder operation (FIG. 18A) to all-cylinders-operation (FIG. 18B) of a modified second embodiment of the present invention.

DETAILED DESCRIPTION OF THE PREFERRED EMBODIMENTS OF THE INVENTION

Figure 1A:
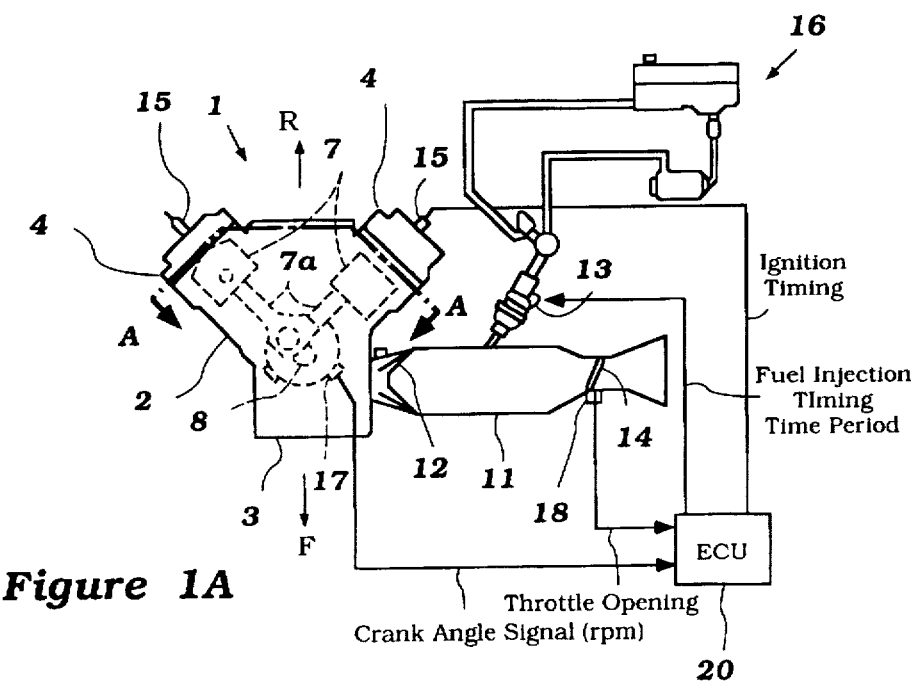
FIGS. 1A and 1B are a schematic view showing a cylinder-disabling control system connected to a two-cycle engine in accordance with a first embodiment of the invention.

Referring now in detail to the drawings, and to a first embodiment shown in FIGS. 1–17 initially by reference to FIG. 1, six cylinders of a two-cycle engine are shown in association with the cylinder-disabling control system of the first embodiment of the present invention.

Basic Structures of Exhaust System

Except for a cylinder-disabling control system of the present invention, basic structures of an exhaust system can be constituted based on a conventional system.

In FIG. 1, a reference numeral 1 is a water-cooling type six-cylinder two-cycle V-type outboard engine with a vertical crankshaft. The engine 1 has a structure in which a crankcase 3 is attached to a cylinder block 2 on the front facing the advancing direction of the outboard, and a cylinder head 4 is attached to the cylinder block 2 on the back, which cylinder block has six cylinders (#1–#6) on two banks (three cylinders on each bank), and a piston 7 is inserted in each cylinder, each piston being connected to a crankshaft 8 with a connecting rod 7a. A reference numeral 15 is an ignition plug.

As shown in an A—A line cross-sectional view of FIG. 1B, cylinders #1, #3, and #5 are aligned vertically in this order on the right bank (hereinafter referred to as "S bank"), and cylinders #2, #4, and #6 are aligned vertically in this order on the left bank (hereinafter referred to as "P bank"), in which cylinders #1, #3, and #5 are in parallel to cylinders #2, #4, and #6. Ignition is conducted in order from #1 to #6 at crank angle intervals of 60 degrees. Cylinders #1 and #2 are called upper cylinders, cylinders #3 and #4 are called middle cylinders, and cylinders #5 and #6 are called lower cylinders.

Figure 2A:
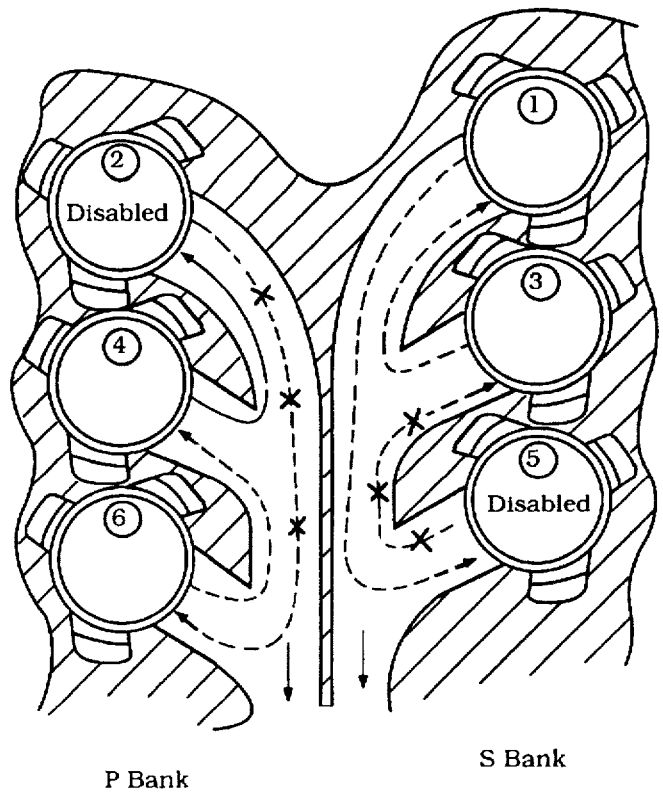
FIGS. 2A and 2B are a view showing exhaust pulse interference occurring in cylinders #1–#6 of the first embodiment of the present invention.
Figure 2B:
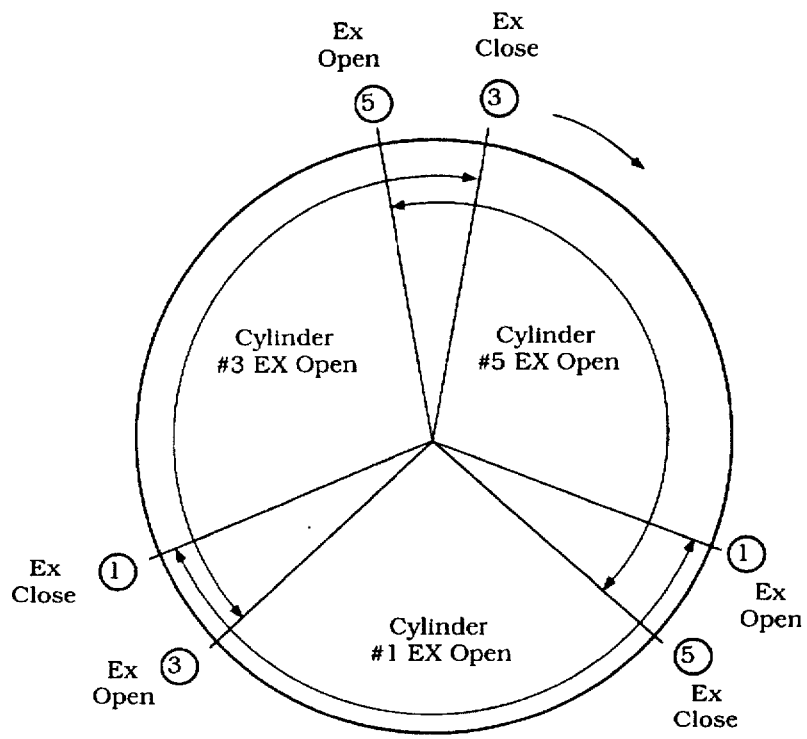
Figure 3:
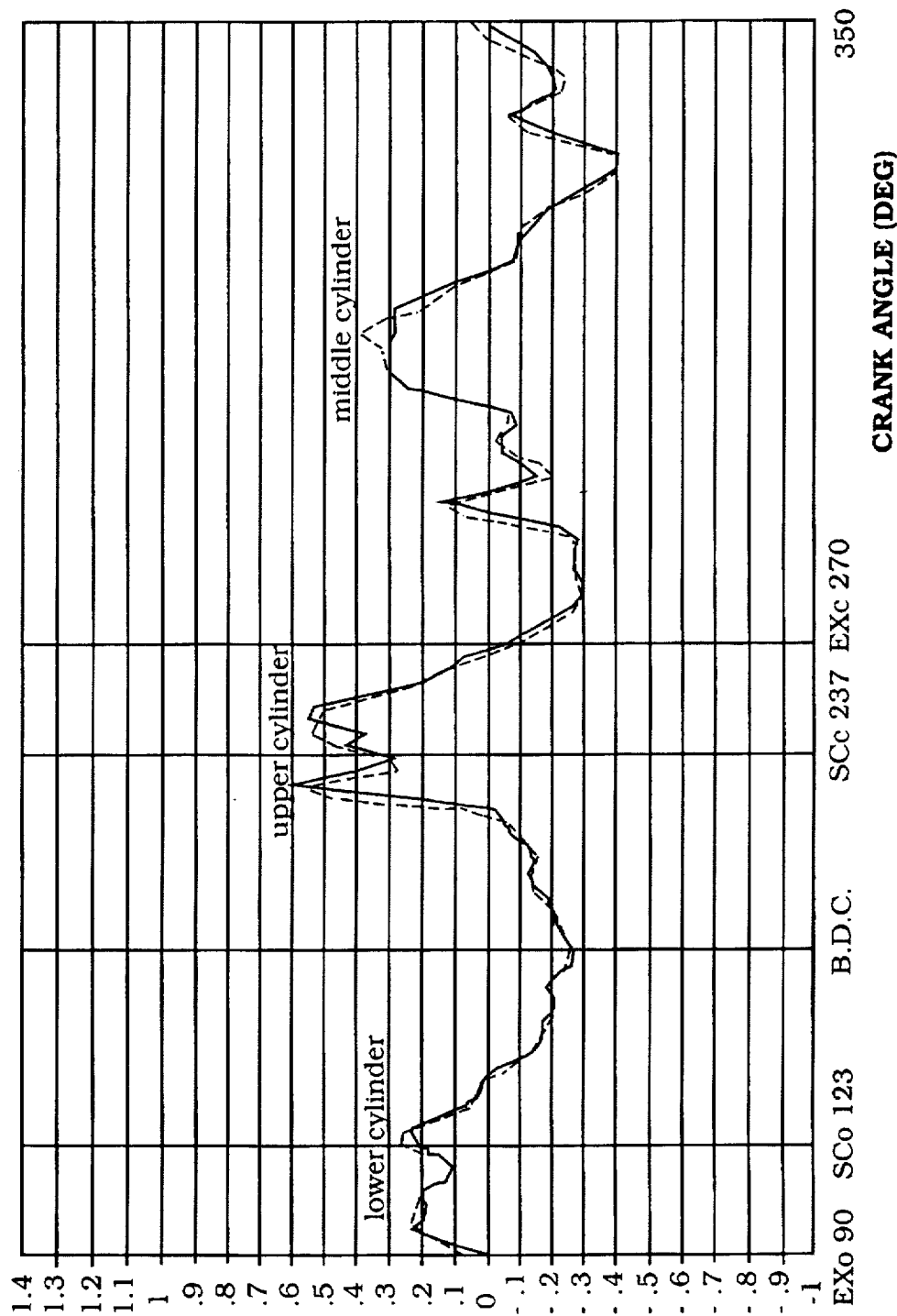
FIG. 3 is a graph showing the relationship between the exhaust pressure and the rotation angle of a crank in the cylinder-disabling control system of the first embodiment of the present invention.

As shown in FIG. 2B, according to the above setting, i.e., 60 degree intervals, the period during which the exhaust port of cylinder #1 is open and the period during which the exhaust port of cylinder #5 is closed are overlapping, and only during the overlapping time period, cylinders #1 and #5 are communicated with each other, thereby exerting intense exhaust pressure from cylinder #1 onto cylinder #5. Since the open period of cylinder #3 and the closed period of cylinder #1 are overlapping, the exhaust pressure from middle cylinder #3 is exerted onto upper cylinder #1. The exhaust pressure from lower cylinder #5 is exerted onto middle cylinder #3 in the same manner. This phenomenon also occurs in the P bank. FIG. 3 is an example showing the relationship between the exhaust pressure and the rotation angle of a crank in the cylinder-disabling control system.

The combustion pressure (i.e., exhaust pressure) is the highest in upper cylinders #1 and #2, and decreases in the middle cylinders (#3 and #4) and at the lower cylinders (#5 and #6) in this order. The reasons for the above are as follows: In order to increase intake air volume and to fully scavenge exhaust gas, taking advantage of exhaust pulses is very effective. For this purpose, relatively long exhaust pipes are required. It is structurally difficult to adopt such long exhaust pipes for all of the cylinders in an engine, especially an outboard engine. However, as understood from FIG. 2A, upper cylinders #1 and #2 are provided with relatively long pipes so that it is possible to take advantage of exhaust pulses efficiently, whereby the intensity of combustion is high, i.e., intense combustion is likely to occur. On the other hand, lower cylinders #5 and #6 do not have long pipes so that sufficient exhaust pulses cannot be generated, and further, the direction of exhaust gas flow and that of exhaust pulses from the upper cylinders are the same, thereby decreasing intake volume from the cylinders, i.e., the remaining gas volume increases, leading to weaking the intensity of combustion so that intense combustion is not likely to occur.

Accordingly, in this embodiment, cylinders #1 and #2 are the most upstream cylinders while cylinders #5 and #6 are the downstream exhaust pulse-effected cylinders. When upper cylinders #1 and #2 and lower cylinders #5 and #6 are simultaneously subjected to combustion, a large quantity of exhaust gas tends to move into cylinders #5 and #6, resulting in unstable combustion if a cylinder-disabling control system of the present invention described later is not adopted.

Figure 1B:
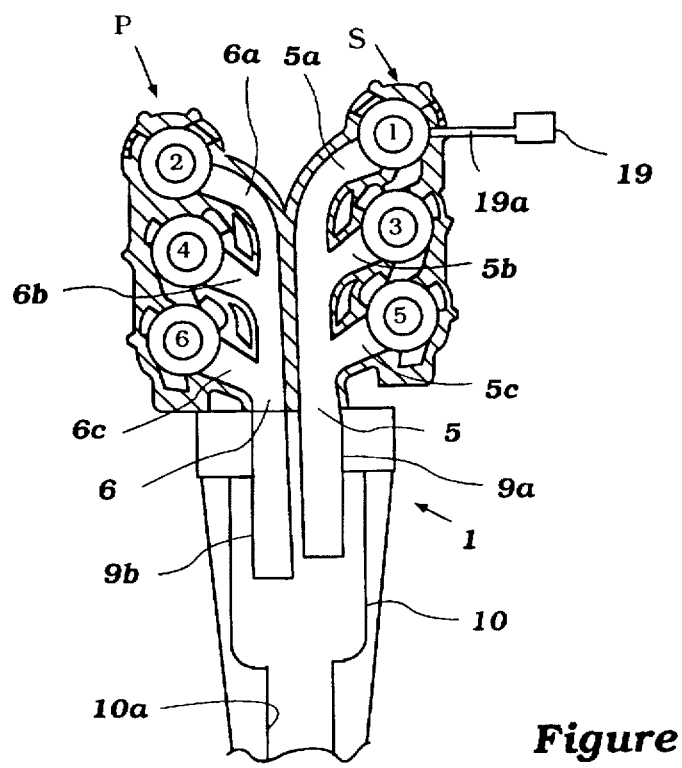

As shown in FIG. 1B, exhaust ports 5a, 5b, and 5c of cylinders #1, #3, and #5, respectively, on the S bank are connected to a right manifold 5 extending in the cylinder-alignment direction, and a right exhaust pipe 9a connecting the manifold 5 is open in the interior of a muffler 10. Exhaust ports 6a, 6b, and 6c of cylinders #2, #4, and #6, respectively, on the P bank are connected to a left manifold 6 extending in the cylinder-alignment direction, and a left exhaust pipe 9b connecting the manifold 6 is open in the interior of a muffler 10. Exhaust gas discharged into the muffler 10 is further discharged into water through an exhaust pipe 10a via peripheral areas around the driving shaft of a propulsion device.

To each crank room of the crankcase 4, an intake pipe 11 is connected to constitute an independent intake system. Each intake pipe 11 is provided with a check-lead valve 12, a fuel injection valve 13, and throttle valve 14. The reference numeral 16 is a fuel supply system which supplies high-pressure fuel to the fuel injection valve 13 (FIG. 1A).

In addition, the engine 1 of this embodiment is provided with a crank-angle sensor 17 for sensing the engine rpm's, a throttle sensor 18 for sensing the opening (load) of the throttle valve 14, and an $O_2$ sensor 19 for sensing the $O_2$ concentration as well as the fuel/air ratio in cylinder #3.

The above $O_2$ sensor 19 is connected to a downstream portion of an exhaust collection outlet 19a formed in a position closer to the combustion chamber than the exhaust port 5a is, thereby detecting the oxygen concentration of nearly pure burned gas which does not contain blow-by gas, and further detecting the fuel/air ratio of the fuel to the air in a mixed gas introduced into cylinder #1.

Cylinder-Disabling Control System

The engine of this embodiment is equipped with an ECU 20 which controls the ignition timing of the engine, the fuel injection volume, the timing of injection, the timing of disabling and operating cylinders, and the like. The ECU 20 has the following functions:

I. An operation mode selector for selecting either a cylinder-disabling mode in which at least one but not all of the cylinders are disabled, or an all-cylinders-engaged mode in which all of the cylinders are operated, depending on the engine performance determined by the engine rpm's and the throttle opening.

II. A designator for designating cylinder(s) to be disabled in the cylinder-disabling mode.

III. A fuel injection controller in the all-cylinders-engaged mode.

IV. A fuel injection controller in the cylinder-disabling mode.

V. An ignition timing controller in the all-cylinders-engaged mode.

VI. An ignition timing controller in the cylinder-disabling mode.

VII. A resuming controller for controlling, for example, selection of cylinder(s) to be resumed when resuming operation from the cylinder-disabling mode.

VIII. A fuel injection controller when resuming operation from the cylinder-disabling mode.

IX. An ignition timing controller when resuming operation from the cylinder-disabling mode.

X. A designator for designating constantly-disabled cylinder(s) when resuming operation from the cylinder-disabling mode after the cylinder-disabling mode is released.

In order to control the aforesaid ignition timing and fuel injection volume, the ECU 20 includes a first control map (i.e., all-cylinder operation map) for setting the fuel injection volume and the ignition timing for each cylinder in the all-cylinders-engaged mode, and a second control map (i.e., cylinder-disabling map) for setting the fuel injection volume and the ignition timing for each cylinder when the cylinder-disabling mode is selected.

Figure 4:
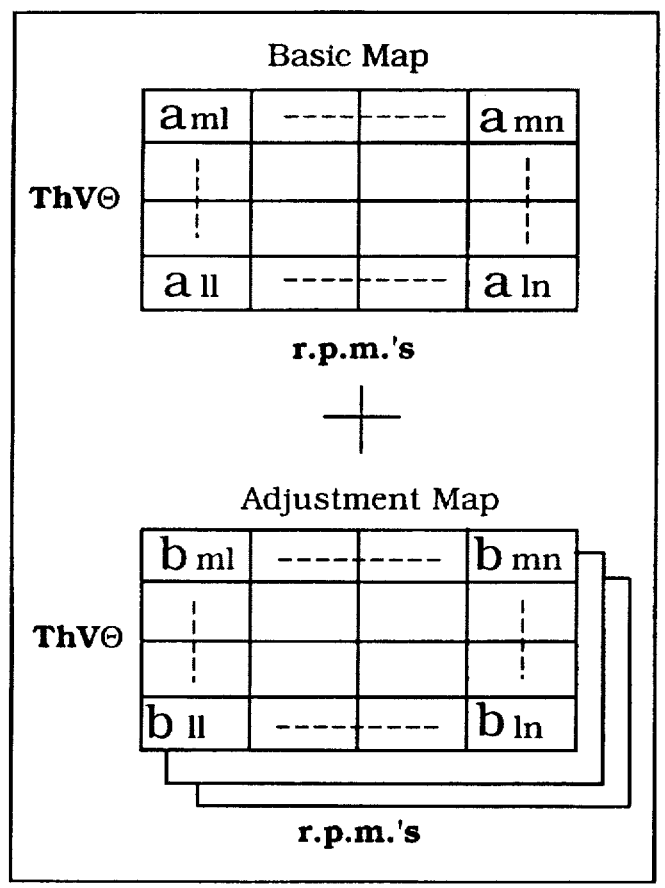
FIG. 4 is a schematic map showing the relationship between the engine rpm's, the throttle angle, and the fuel injection volume in the all-cylinders-engaged mode of the first embodiment of the present invention.

As shown in FIG. 4, the all-cylinder operation map is composed of a basic map for determining the basic fuel injection volume based on the engine rpm's and the throttle opening (THvθ), and an adjusting map for adjusting the above basic fuel injection volume between cylinders depending on intake air volume characteristics of upper, middle, and lower cylinders.

Figure 5:
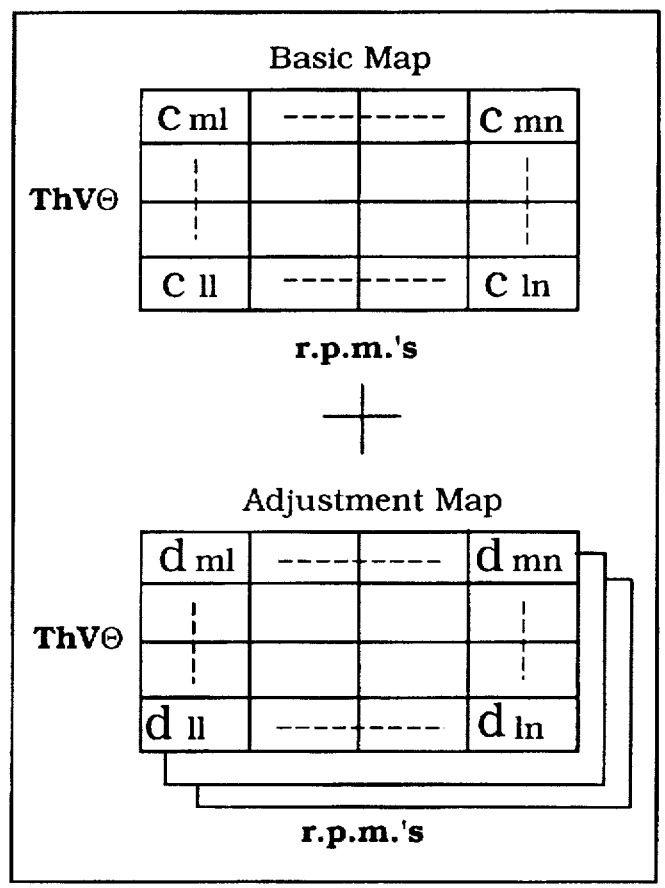
FIG. 5 is a schematic map showing the relationship (Pattern No. 1) between the engine rpm's, the throttle angle, and the fuel injection volume in the cylinder-disabling mode of the first embodiment of the present invention.
Figure 6:
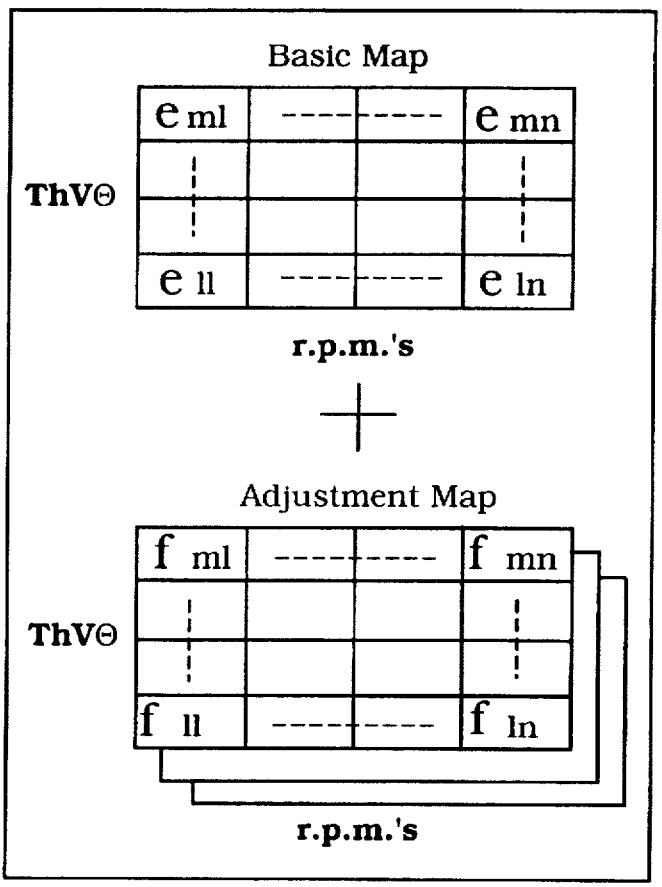
FIG. 6 is a schematic map showing the relationship (Pattern No. 2) between the engine rpm's, the throttle angle, and the fuel injection volume in the cylinder-disabling mode of the first embodiment of the present invention.

As shown in FIGS. 5 and 6, depending on the disabling patterns, the cylinder-disabling map is composed of a pattern No. 1 map (FIG. 5) for the case in which cylinders #1 and #2 are constantly disabled and the remaining cylinders are operated, and a pattern No. 2 map (FIG. 6) for the case in which cylinders #5 and #6 are constantly disabled and the remaining cylinders are operated.

Figure 7:
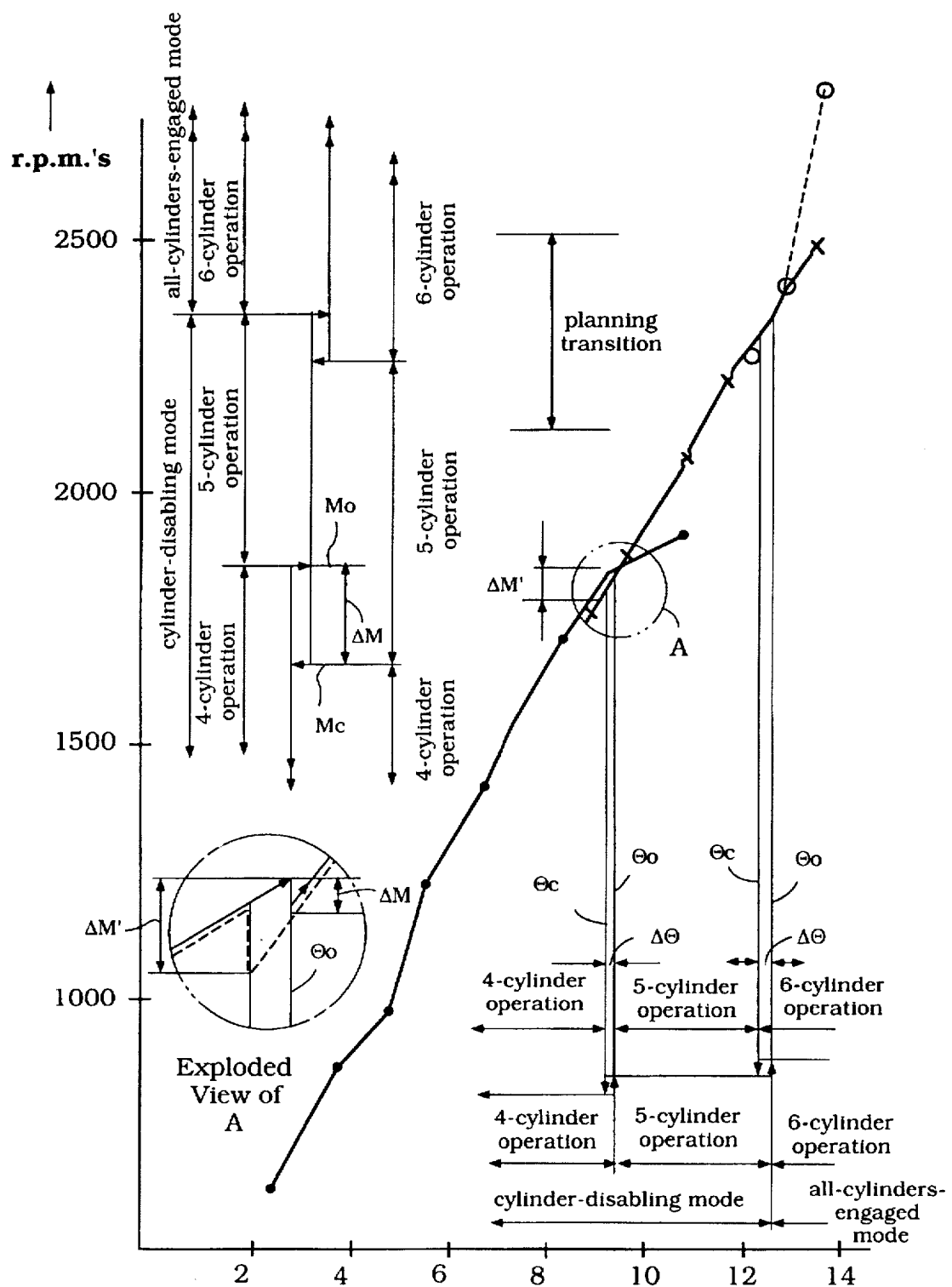
FIG. 7 is a schematic graph showing a control range of the cylinder-disabling control system of the first embodiment of the present invention in connection with the relationship between the throttle opening and the engine rpm's.

I. Functions as Operation Mode Selector As shown in FIG. 7, depending on the throttle opening or the engine rpm's, one operation mode is selected from the cylinder-disabling mode, i.e., four-cylinder operation or five-cylinder operation, or the all-cylinders-engaged mode, i.e., six-cylinder operation. By a selection switch (not shown), either the throttle opening control or the engine revolution control is selected.

Irrespective of whether disabled cylinder(s) are predesignated or designated at a time, cylinder-disabling operation is conducted by ceasing ignition in the cylinder, and fuel supply to the disabled cylinder is continued via the fuel injection valve 13.

When switching the operation mode based on the throttle opening, a certain hysteresis opening $\Delta\theta$ is set between first throttle opening $\theta_C$, i.e., the throttle opening on the closed side when reducing the number of operating cylinder(s), and second throttle opening $\theta_O$, i.e., the throttle opening on the open side when increasing the number of operating cylinders.

When switching the operation mode based on the engine rpm's, a certain hysteresis rpm's, $\Delta M$, is set between first engine rpm's, $M_C$, i.e., the engine rpm's on the reduced side when reducing the number of operating cylinder(s), and second engine rpm's, $M_O$, i.e., the engine rpm's on the increasing side when increasing the number of operating cylinders.

The hysteresis engine rpm's, $\Delta M$, should be greater than engine rpm's, $\Delta M'$, corresponding to the hysteresis opening $\Delta\theta$ for the following reasons: In the case of an outboard engine such as in this embodiment, the engine rpm's widely fluctuate due to impact of waves or the like even when the throttle opening remains the same. Thus, when controlling the above switching operation based on the engine rpm's, if hysteresis rpm's are not sufficiently high, hunting, i.e., frequently changing the number of operating cylinder(s), is likely to occur.

In contrast, when controlling the above switching operation based on the throttle opening, it is possible to prevent hunting even though hysteresis $\Delta\theta$ and further $\Delta M$ are set low. Thus, it is preferable to control the switching based on the throttle opening.

Figure 20:
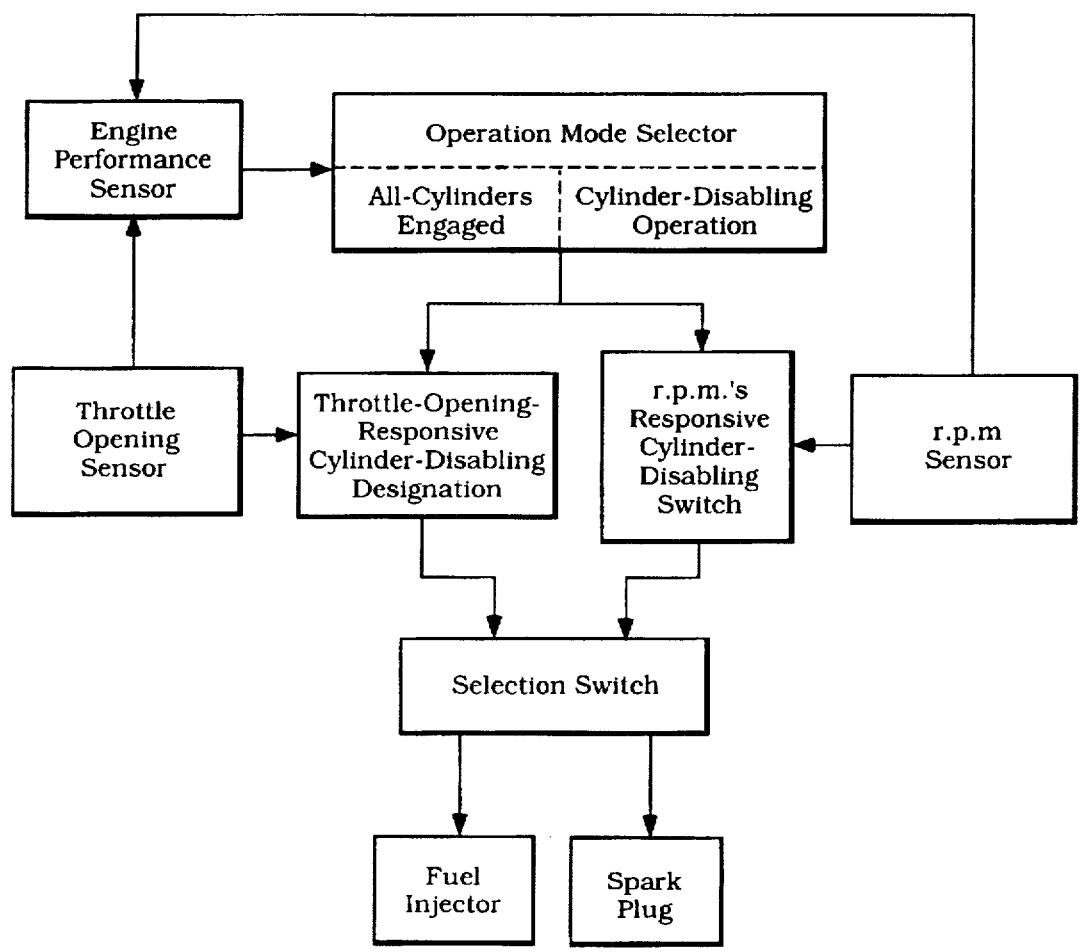
FIG. 20 is a diagrammatic view showing the interrelationship between the components in an arrangement utilized to control the throttle opening or engine RPM hysteresis.

The above disabling control based on the throttle opening hysteresis or the engine rpm hysteresis is schematically shown in FIG. 20.

II. Functions as Designator for Disabled Cylinders

Cylinders are designated as disabled in such a way that the phase difference between every two disabled cylinders is constant. In this embodiment, the ignition intervals between every two cylinders next to each other from cylinder #1 through cylinder #6 are 60 degrees, and in order to set a constant phase difference between the disabled cylinders, upper cylinder #2 on the P bank and lower cylinder #5 on the S bank are disabled, for example. Accordingly, every time two cylinders are subjected to ignition, one cylinder is disabled, so that the overall ignition intervals become constant when designating disabled cylinders, thereby balancing the ignition timing, and stabilizing low speed drive.

In addition, disabled cylinders are selected in such a way that, on each bank, the most upstream cylinder and the downstream cylinder which receives influence of exhaust gas and exhaust pulses from the most upstream cylinder do not occur at the same time. In this embodiment, in order to prevent such a simultaneous ignition, uppermost cylinder #2 on the S bank and lower cylinder #5 are disabled.

Accordingly, when the most upstream cylinder #1 on the S bank is operated, lower exhaust pulse-effected cylinder #5 is disabled. On the P bank, when lower cylinder #6 is operated, upper cylinder #2 is disabled, thereby preventing simultaneous ignition.

By avoiding simultaneous ignition of the most upstream cylinder and lower cylinder, it is possible to facilitate low-speed stability while in the cylinder-disabling mode for the following reasons: FIG. 2 is a view showing exhaust pulse interference occurring in cylinders #1–#6. FIG. 2A is a schematic cross-sectional view showing cylinders #1–#6 and exhaust pluses. Exhaust pulses from upper cylinder #1, middle cylinder #3, and lower cylinder #5 are exerted on lower cylinder #5, upper cylinder #1, and middle cylinder #3, respectively. This is because, as shown in FIG. 2B, the closed periods of the exhaust ports of cylinders #5, #1, and #3, which receive influence, and the open period of the exhaust ports of cylinders #1, #3, and #5, which influence the above respective cylinders, are overlapped. Incidentally, the direction of exhaust gas flow from upper cylinders #1 and #2 and the direction of exhaust pulses are the same, and thus, combustion in lower cylinders #5 and #6 is likely to be disturbed. However, in this embodiment, when lower cylinder #6 is operated, upper cylinder #2 is disabled, and when upper cylinder #1 is operated, lower cylinder #5 is disabled, thereby eliminating influence of exhaust pulses, and improving low-speed stability.

III. Functions as Fuel Injection Controller in All-Cylinders-Engaged Mode

The fuel injection control in the all-cylinders-engaged mode is conducted based on the map of FIG. 4 showing the relationship between the engine rpm's, the throttle angle, and the fuel injection volume in the all-cylinders-engaged mode. The fuel injection volume in each cylinder of the upper cylinders, the middle cylinders, and the lower cylinders is in descending order. As described earlier, in the case of an outboard engine, it is structurally difficult to adopt to all of the cylinders exhaust pipes sufficiently long to obtain exhaust pulse effects. However, the upper cylinders are provided with relatively long pipes so that it is possible to take advantage of exhaust pulses efficiently, thereby increasing the intake volume and the fuel injection volume. On the other hand, the lower cylinders do not have long pipes so that sufficient exhaust pulses cannot be generated, and further, the direction of exhaust gas flow and that of exhaust pulses from the upper cylinders are the same, thereby decreasing intake volume from the cylinders and the fuel injection volume.

IV. Functions as Fuel Injection Controller in Cylinder-Disabling Mode

The fuel injection volume control while in the cylinder-disabling mode is conducted based on the fuel injection volume maps for the cylinder-disabling mode, depending on disabling patterns (FIGS. 5 and 6). When upper cylinder #1 or #2 is disabled, the fuel injection volume control is conducted based on the pattern No. 1 of FIG. 5. In this disabling pattern No. 1, as shown in FIG. 8B, the fuel injection volume is significantly increased as a whole, as compared with that in the all-cylinders-engaged mode (FIG. 8A), and further, the difference in the fuel injection volume between the middle cylinder and the lower cylinder is small. This is because the back pressure of the exhaust gas is reduced due to the upper cylinder being disabled, and the intake volume in the lower and middle cylinders is increased to a great extent due to no influence on the lower cylinder, thereby increasing the overall fuel injection volume. In addition, since there is no influence from the upper cylinder, the intake volume of the lower cylinder is as high as that of the middle cylinder, thereby reducing the difference in the fuel injection volume between the lower cylinder and the middle cylinder.

When a lower cylinder is disabled (disabling pattern No. 2), the fuel injection volume control is conducted based on the map of FIG. 6. In this case, as shown in FIG. 8C, as compared with in the all-cylinders-engaged mode, the overall fuel injection volume of the upper cylinder is a little decreased, and that of the middle cylinder is significantly increased. This is because the back pressure of the exhaust gas is reduced due to the lower cylinder being disabled, and there is no influence from the lower cylinder, leading to that the fuel injection volume in the middle cylinder is increased to a great extent, and the fuel injection volume in the upper cylinder is a little decreased due to increasing influence from the middle cylinder, thereby reducing the difference in the fuel injection volume between the upper cylinder and the middle cylinder.

V. Functions as Ignition Timing Controller in All-Cylinders-Engaged Mode

In the all-cylinders-engaged mode, as shown in FIG. 9A, advanced timing control is conducted to all of the cylinders in association with an increase in the engine rpm's, similarly as a whole to the conventional engines. However, when focusing each cylinder, the upper the cylinder the greater the delayed timing control is conducted. As described earlier, the upper the cylinder the more the fuel injection volume is increased, and thus, in order to equalize combustion intensity of each cylinder, the more the fuel injection volume the less the angle for advanced timing is employed.

VI. Functions as Ignition Timing Controller in Cylinder-Disabling Mode

In the upper cylinder-disabling mode based on the pattern No. 1, as shown in FIG. 9B, as compared with in the all-cylinders-engaged mode, the ignition timing is set to be delayed in a low speed range and advanced in a middle speed range, thereby suppressing an excess increase in combustion intensity due to a great increase in the fuel injection volume in the low speed range, and compensating for reduced output due to a decrease in the number of operating cylinders in the middle speed range. When focusing each cylinder, the angle for delayed timing is widened because the fuel injection volume of the lower cylinder is further increased, and the difference in the ignition timing between the lower cylinder and the middle cylinder.

In the lower cylinder-disabling mode based on the pattern No. 2, as shown in FIG. 9C, as compared with in the all-cylinders-engaged mode, the angle is low in a low speed range and steady in a middle speed range, thereby widening the angle for delayed timing in the low speed range, especially of the middle cylinder. The reason for the above is to control imbalance of combustion intensity generated by an increase in the fuel injection volume of the middle cylinder.

Figure 10:
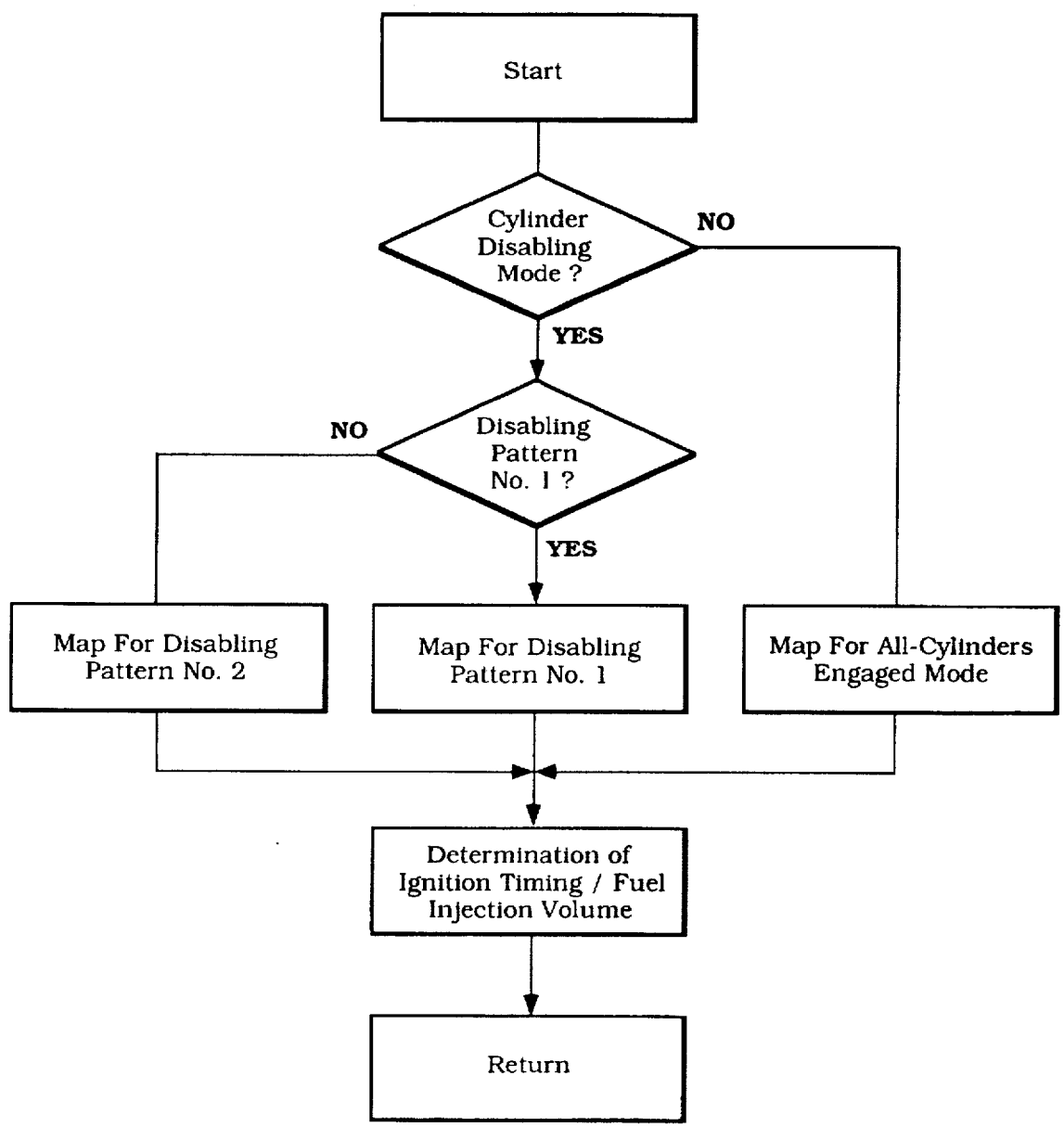
FIG. 10 is a flow chart showing the control flow of the first embodiment of the present invention.

FIG. 10 is a flow chart showing the control flow of the above fuel injection volume and the ignition timing. In step S1, it is determined whether or not the cylinder-disabling mode is selected based on the engine performance, and in step S2, the map for all-cylinder operation is referred to when the mode is not the cylinder-disabling mode. If the mode is the cylinder-disabling mode, it is determined which pattern is selected, disabling pattern No. 1 or No. 2, and in steps S3–S5, the control map for disabling pattern No. 1 or the control map for disabling pattern No. 2 is referred to. In step S6, the most appropriate ignition timing and fuel injection volume are determined.

VII. Functions as Resuming Controller

When the all-cylinders-engaged mode is resumed from the cylinder-disabling mode, (a) the number of operating cylinders is increased one at a time, (b) the downstream cylinders which are not likely to undergo intense combustion is resumed precedent to other cylinders, and/or (c) the conditions under which the change induced by a change in the number of operating cylinders is not easily perceived are employed, thereby avoiding deterioration of continuous and smooth transition, due to impact caused when resumed.

Figures 11A, 11B, 11C:
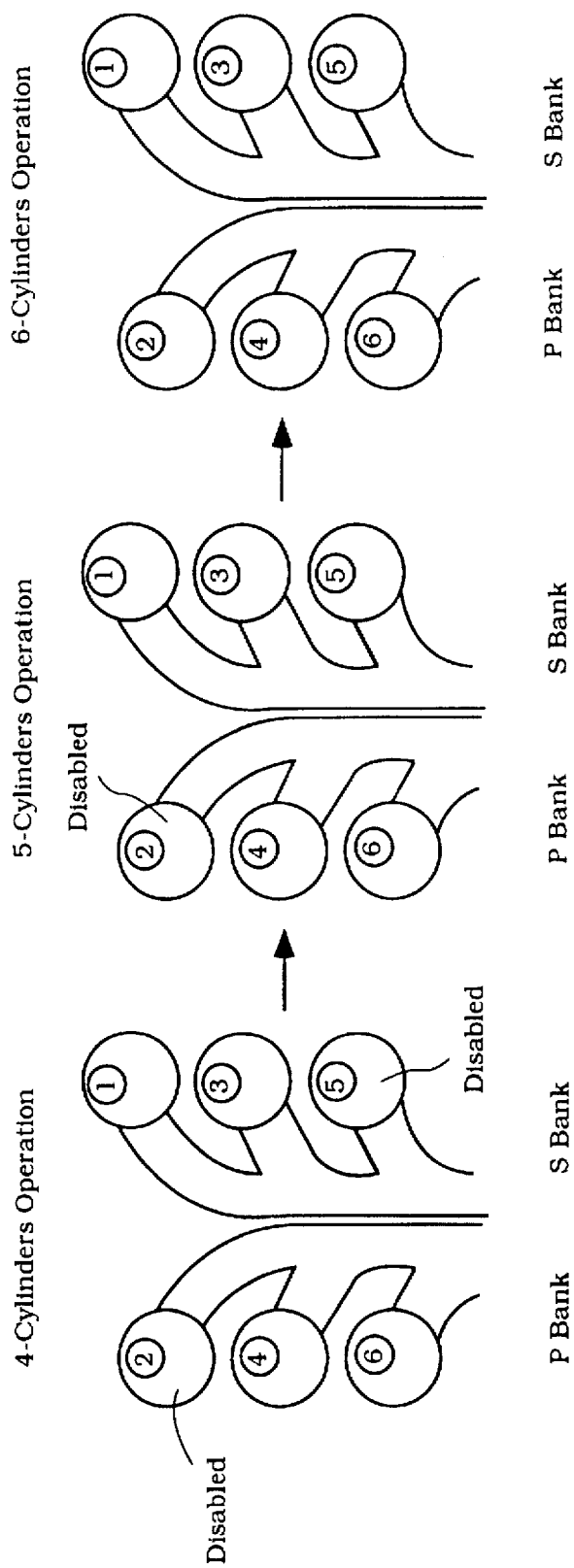
FIGS. 11A—11C are a schematic illustration showing an example of switching procedures from the cylinder-disabling mode to the all-cylinders-engaged mode of the first embodiment of the present invention.

(a) While in the cylinder-disabling mode in which four-cylinder in the engine 1 of this embodiment are operated, upper cylinder #2 on the P bank and lower cylinder #5 on the S bank are disabled. In this case, in order to resume the all-cylinders-engaged mode, i.e., six-cylinder operation, first, lower cylinder #5 on the S bank is resumed so as to operate five cylinders (FIGS. 11A and 11B), and then upper cylinder #2 on the P bank is resumed (FIG. 11C).

In the case of an outboard two cycle engine having an exhaust manifold, as clarified earlier with regard to the aspect in which the number of operating cylinders is reduced, when the number of operating cylinders is increased, the fuel injection volume and the ignition timing of the cylinder(s) not only resumed from the disabled state but also operating are changed to a great extent, thereby easily inducing combustion disturbance when the number of operating cylinders is increased. In this embodiment, the number of operating cylinders is increased one at a time, so that it is possible to prevent combustion disturbance at least on one side of the banks, thereby facilitating the transition from the cylinder-disabling mode to the all-cylinders-engaged mode.

(b) It is effective to select a cylinder which hardly undergoes intense combustion, in order to facilitate the transition. In the lower cylinders of the engine 1 of this embodiment, since the direction of exhaust pulses from the upper cylinders and the that of exhaust gas flow are the same, the fuel gas volume remaining in the cylinders is high, and thus intense combustion is likely to occur when resuming operation of the cylinders. In this embodiment, when increasing the number of operating cylinders, first, lower cylinder #5 on the S bank which hardly undergoes intense combustion is resumed so as to perform five-cylinder operation, thereby suppressing impact caused by intense combustion when resumed, and facilitating the transition.

When switching from the above five-cylinder operation to six-cylinder operation, upper cylinder #2 on the P bank which easily undergoes intense combustion is resumed. At the time the six-cylinder operation is activated, the engine rpm's are relatively high, and the overall output power of the engine is large, so that even if intense combustion occurs, the influence thereof is not significant.

(c) In addition, in order to facilitate the transition, it is effective to set, for example, a switching point from the five-cylinder operation to the six-cylinder operation, or vice versa, at the engine rpm's and the ignition timing during planing (water-sliding) transition (FIG. 7). During this planing transition, a change in position of a hull is large so that a change in engine rpm's and engine noise due to the change in the number of operating cylinders may not be perceived.

Figure 21:
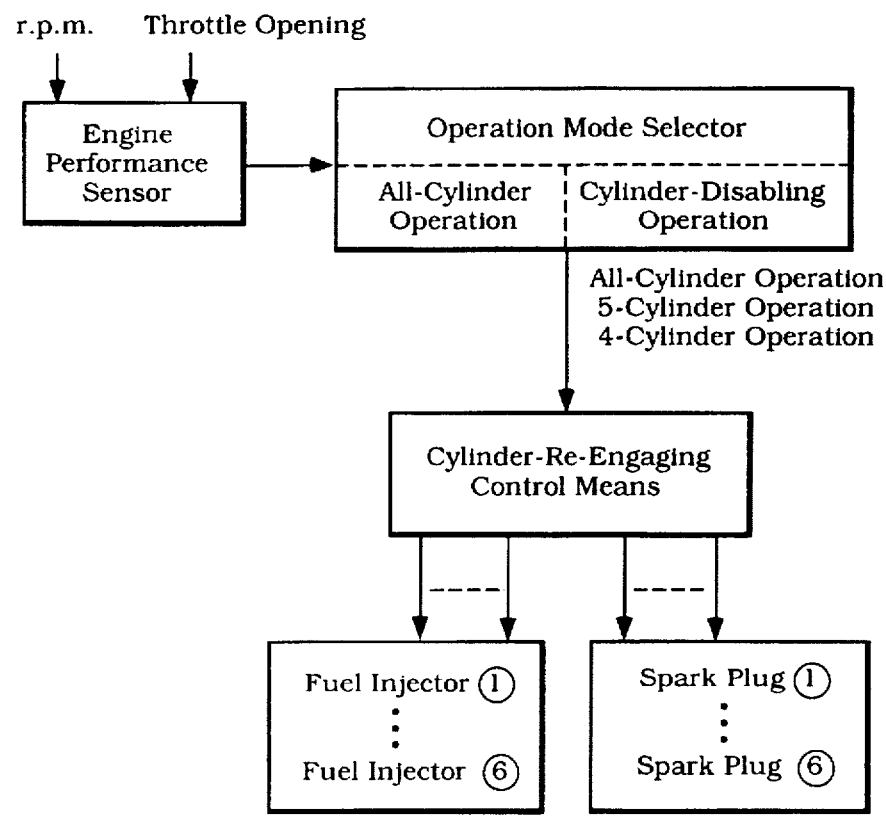
FIG. 21 is a diagrammatic view showing the interrelationship between the components employed in connection with another control routine.

The aforesaid disabling control is schematically illustrated in FIG. 21.

Figure 22:
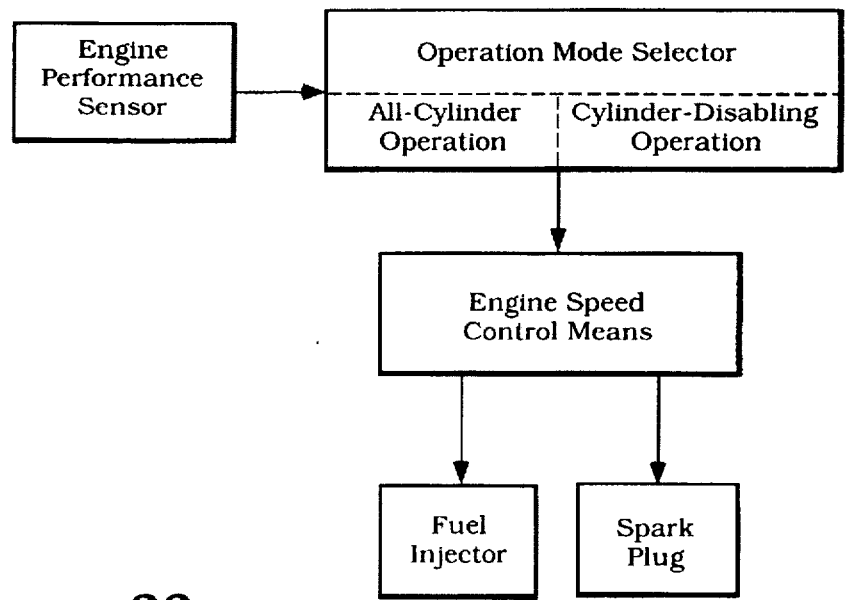
FIG. 22 is a diagrammatic view showing the interrelationship between the components during a still further flow control routine for controlling the interrelationship of operation of various cylinder banks.

As another control flow, it is also effective to control the engine rpm's in the bank, in which the number of operating cylinders is greater than that in the other bank, at a low level while maintaining the same throttle opening, as schematically illustrated in FIG. 22. For example, as shown in an enlarged portion of "A" in FIG. 2, when switching from four-cylinder operation to five-cylinder operation at throttle opening $\theta_O$, the engine rpm's are decreased by $\Delta m$.

The reasons for the above are as follows: A factor, which makes us feel that continuous and smooth transition deteriorates when the number of operating cylinders is increased, is an increase in the engine rpm's. When the number of operating cylinders is increased, the number of combustion is increased, and therefore, we tend to feel that the engine rpm's are increased even if the engine rpm's remain the same. Thus, when the number of operating cylinders is increased, the engine rpm's in the bank in which the number of operating cylinders is increased are reduced at approximately a switching point.

VIII. Functions as Fuel Injection Controller When Resuming Operation

Figure 12:
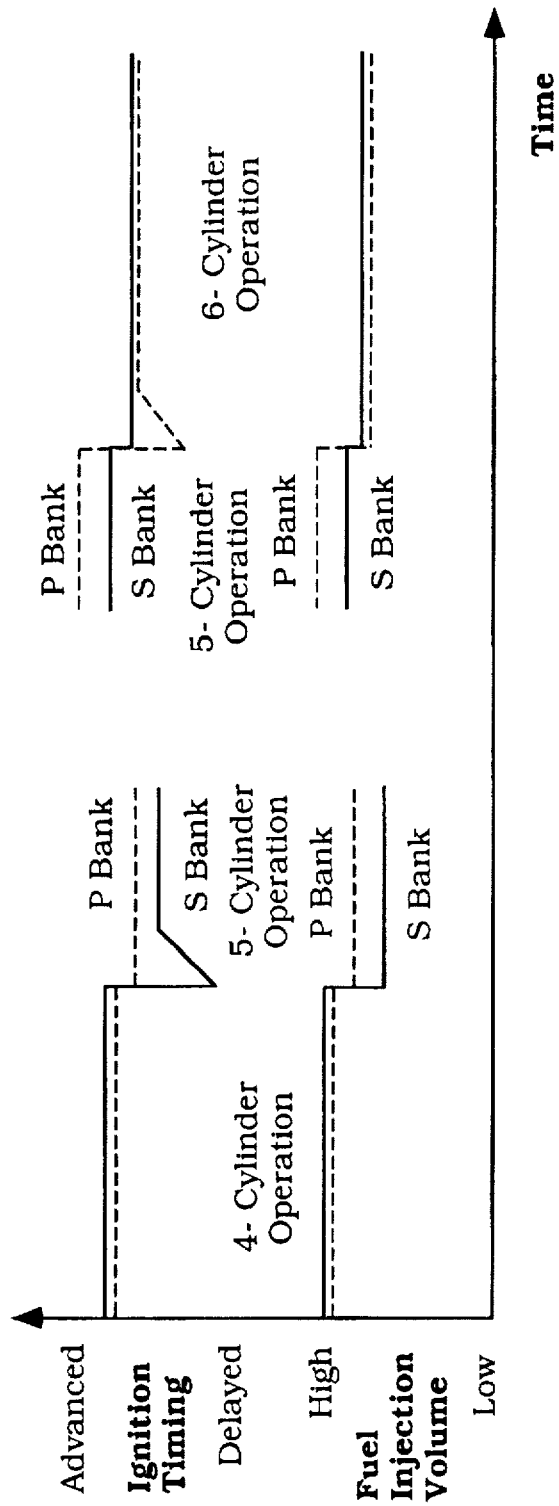
FIG. 12 is a schematic graph showing the relationship of the timing of ignition and the fuel injection volume vs. time-in-transition from four-cylinder operation, five-cylinder operation, and all-cylinder operation of the first embodiment of the present invention.

In relation to an increase in the engine rpm's, six-cylinder operation is resumed from four-cylinder operation via five-cylinder operation. As shown in FIG. 12, when the number of operating cylinders is increased, the fuel injection volume is reduced, and the ignition timing is slowed, thereby mitigating impact when the number of resumed cylinders is increased, and facilitating the transition.

Figure 13:
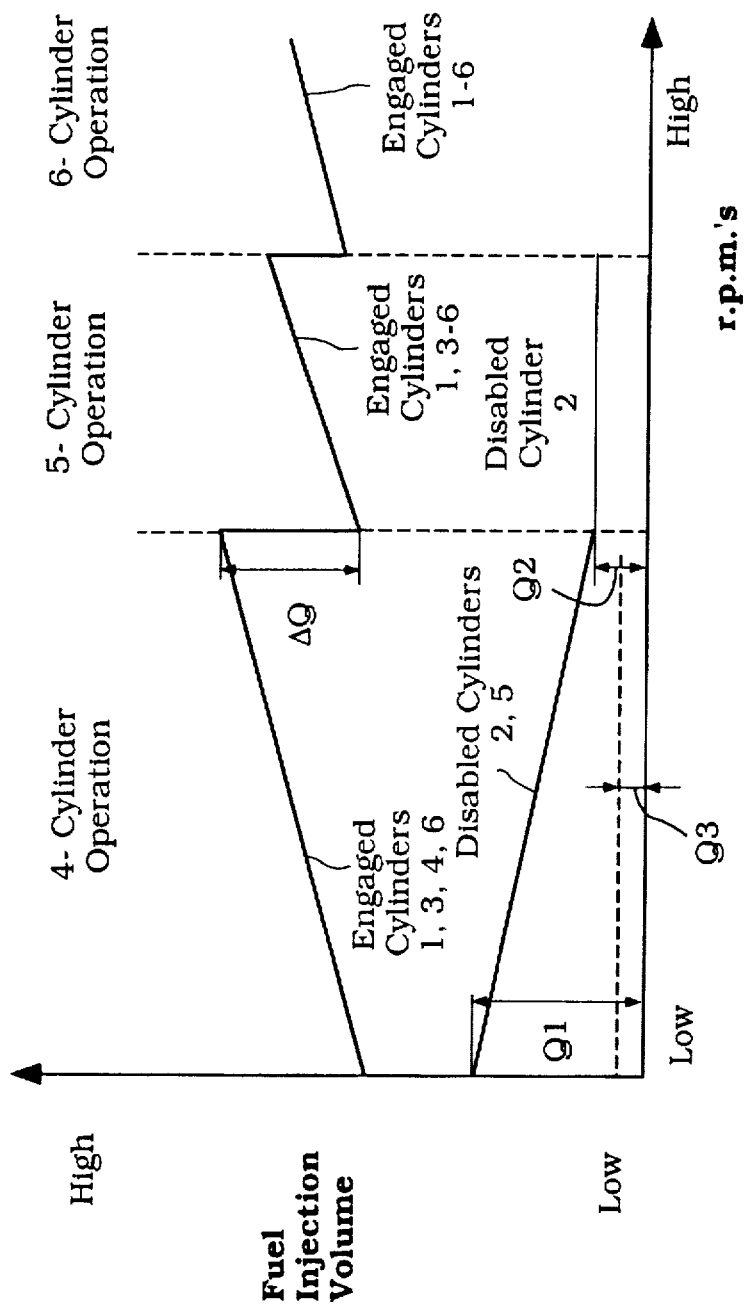
FIG. 13 is a schematic graph showing the relationship between the fuel injection volume and the engine rpm's in transition from four-cylinder operation, five-cylinder operation, and all-cylinder operation of the first embodiment of the present invention.

As shown in FIG. 13, the fuel injection volume per cylinder is increased in relation to an increase in the engine rpm's, and once decreased by $\Delta Q$ when the number of operating cylinders is increased, and then increased in relation to an increase in the engine rpm's again (solid lines in FIG. 13).

The fuel injection volume to lower cylinder #5 on the S bank and upper cylinder #2 on the P bank, which are disabled cylinders while in four-cylinder operation, is controlled in such a way that fuel injection volume $Q_1$ at a low revolution range near idle rpm's is greater than fuel injection volume $Q_2$ in transition towards five-cylinder operation, and fuel injection volume $Q_1$ is gradually reduced towards $Q_2$ in association with an increase in the engine rpm's. In five-cylinder operation, the fuel injection volume is controlled in such a way that the fuel injection volume to upper disabled cylinder #2 is a little increased from $Q_2$ until operation of the cylinder is resumed.

In order to facilitate the transition by mitigating impact or shock when resumed, it is conceivable that the fuel volume to predesignated cylinder #5 to be resumed is preferably set as low as $Q_3$ indicated by a broken line. However, when reducing the fuel volume to such a level, the fuel adhering to the wall of an intake channel becomes very little, and thus, it is very difficult to respond to sharp acceleration because even when the throttle opening urgently opens for sharp acceleration in trolling at low rpm's near idle rpm's, fuel adheres to the wall first, and the concentration of fuel in the cylinder does not increase. In this embodiment, since the fuel volume at rpm's near trolling rpm's is increased to $Q_1$, and the fuel volume in transition towards five-cylinder operation is decreased to $Q_2$, it is possible to respond to sharp acceleration in trolling, and facilitate the transition by mitigating impact or shock caused by intense combustion in transition towards five-cylinder operation.

Figures 14A, 14B:
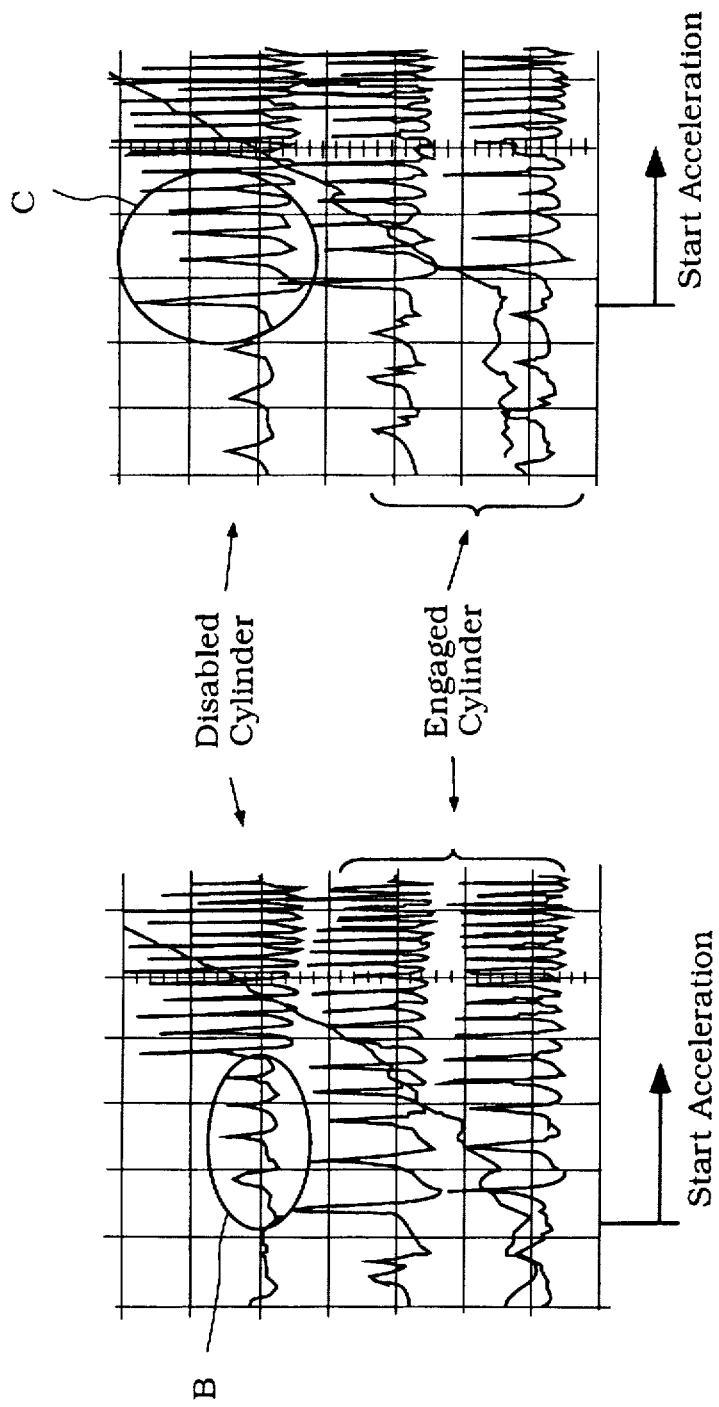
FIGS. 14A and 14B are graphs showing the changes in inside pressure of disabled and operating cylinders when sharply accelerated in the first embodiment of the present invention.

FIG. 14 is graphs obtained by experimentation, showing the changes in inside pressure of disabled and operating cylinders when sharply accelerated. FIG. 14A shows the case in which the fuel volume introduced into the disabled cylinder was as low as $Q_3$, and FIG. 14B shows the embodiment of the present invention in which the fuel volume introduced into the disabled cylinder was initially increased and linearly reduced at a certain rate. When the fuel volume was low, the inside pressure of the cylinder did not go up (circled area B in FIG. 14A), indicating that the cylinder was still disabled. In contrast, in the embodiment of the present invention, the inside pressure in the cylinder was immediately increased, indicating that ignition and combustion were sufficiently performed.

IX. Functions as Ignition Timing Controller When Resuming Operation

Figure 15:
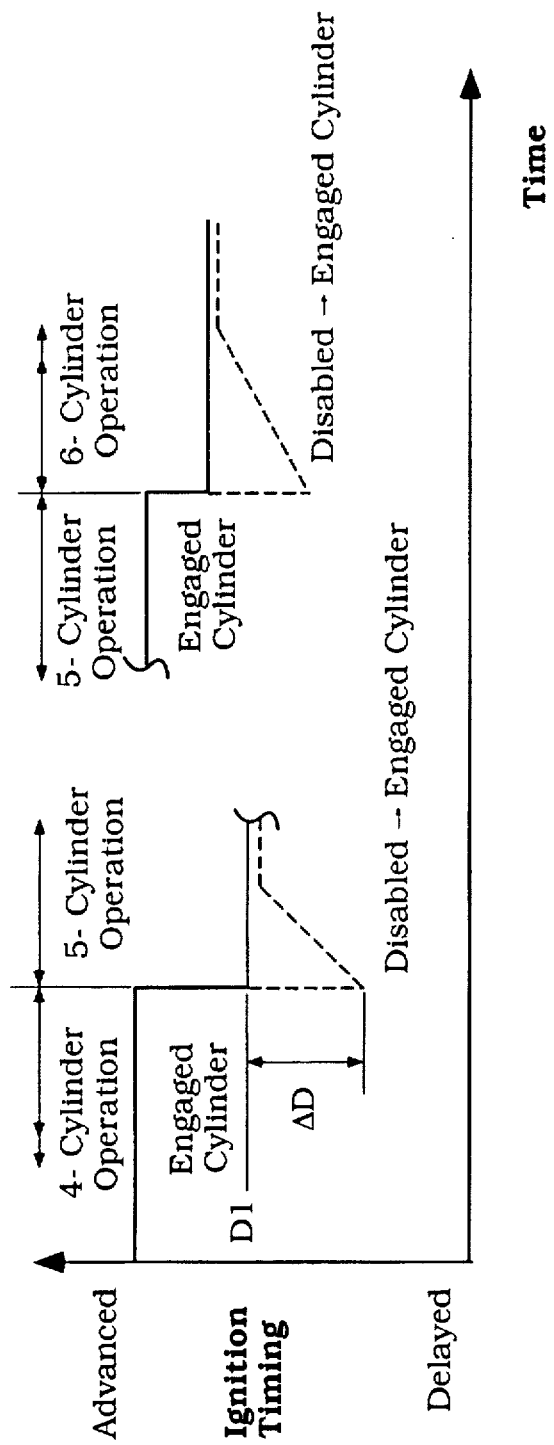
FIG. 15 is a schematic graph showing the relationship of the timing of ignition vs. time-in-transition from four-cylinder operation, five-cylinder operation, and all-cylinder operation of the first embodiment of the present invention.

As shown with a solid line in FIG. 15, in order to facilitate the transition by mitigating impact or shock when resumed, the ignition timing of the operating cylinders is set to be delayed, thereby preventing intense combustion; and the crank angle for the ignition timing of resumed cylinders initially starts at an angle for delayed timing equivalent to normal ignition timing $D_1$ minus $\Delta D$ ($D_1$: the ignition timing of operating cylinders), as indicated by a broken line, and the crank angle for the ignition timing gradually goes forwards towards the normal ignition timing. This crank angle control is conducted in the same way, when five-cylinder operation is shifted to six-cylinder operation.

Figure 23:
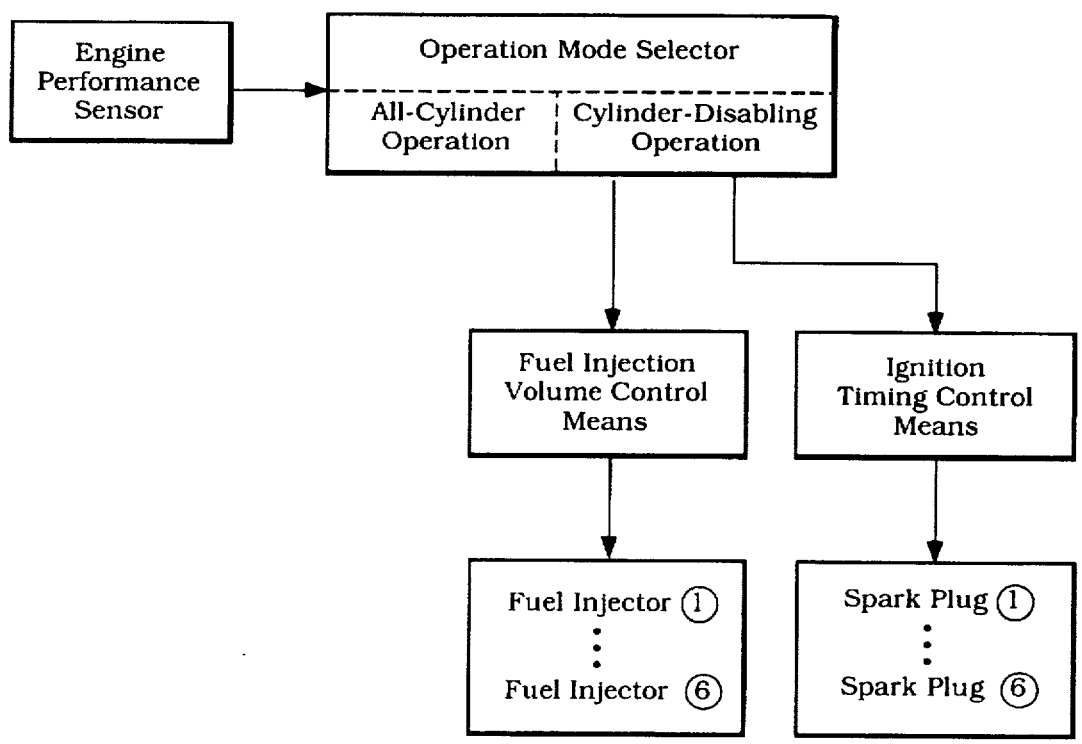
FIG. 23 is a diagrammatic view showing the relationship between certain of the components for varying the fuel injection volume and ignition timing during another type of control routine.

The above disabling control based on the fuel injection volume or the ignition timing is schematically illustrated in FIG. 23.

X. Functions as Designator for Designating Constantly-Disabled Cylinders When Resuming Operation from Cylinder-Disabling Mode after Cylinder-Disabling Mode Is Released In this embodiment, while in four-cylinder operation, upper cylinder #2 and lower cylinder #5 are constantly disabled, and while in five-cylinder operation, upper cylinder #2 is constantly disabled, thereby stabilizing combustion, and improving fuel efficiency and low speed stability. However, since the same cylinders are constantly disabled, fuel is likely to adhere to the spark plug in the cylinder, leading to the occurrence of plug foul. In this embodiment, when a main switch is turned on every after the main switch is turned off, and when resuming operation of the disabled cylinders after all-cylinder operation, a cylinder, which is different from the disabled cylinders designated in the previous cycle, is designated as disabled.

Figure 24:
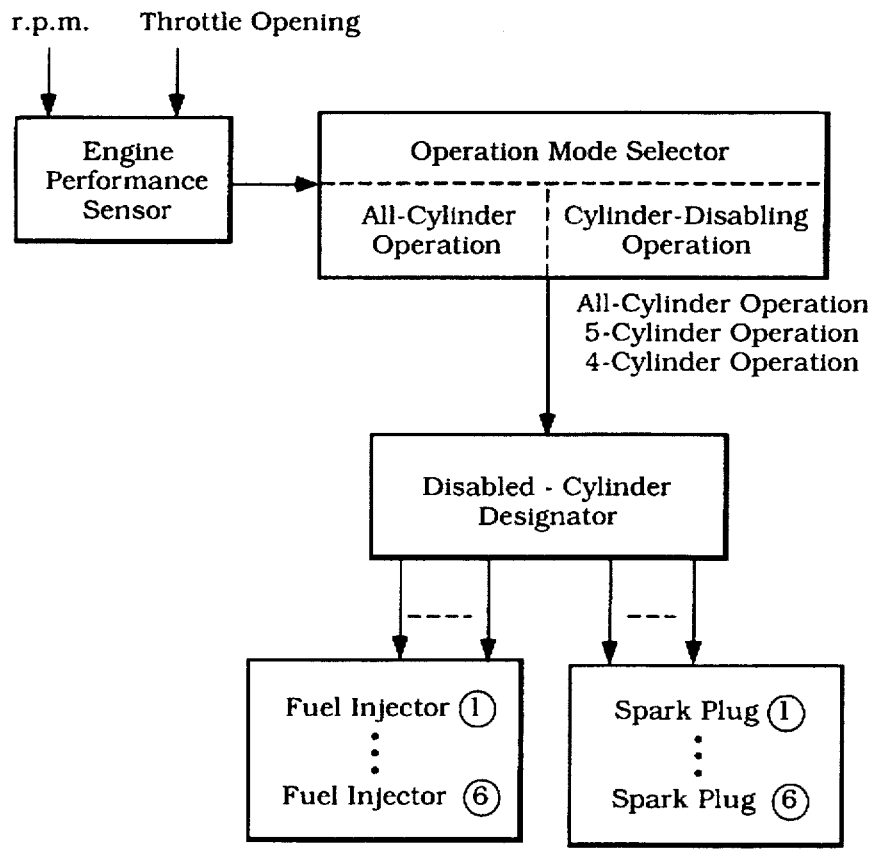
FIG. 24 is a diagrammatic view showing the interrelationship between the components during another form of disabling control routine.

For example, when four cylinders are in operation, upper cylinder #2 and lower cylinder #5 are disabled, and then upper cylinder #1 and lower cylinder #6 are disabled. When five cylinders are in operation, upper cylinder #2 is disabled, and then upper cylinder #1 is disabled. Accordingly, the fuel adhereing to the spark plug while being disabled is burned off, thereby preventing plug foul in the cylinder. This type of disabling control is schematically illustrated in FIG. 24.

Other Embodiments In this embodiment, in cylinder disabling pattern No. 1 and No. 2 described earlier, upper cylinders or lower cylinders are constantly designated as disabled. However, other patterns can be adopted. FIGS. 16 and 17 are schematic graphs showing the relationship between the fuel injection volume and the engine rpm's with a parameter of cylinders (FIG. 16) and the relationship between the ignition timing and the engine rpm's with a parameter of cylinders (FIG. 17) in a second embodiment. In this embodiment, in disabled cylinders, fuel is continuously introduced while ignition is conducted at intervals.

Figures 16A, 16B:
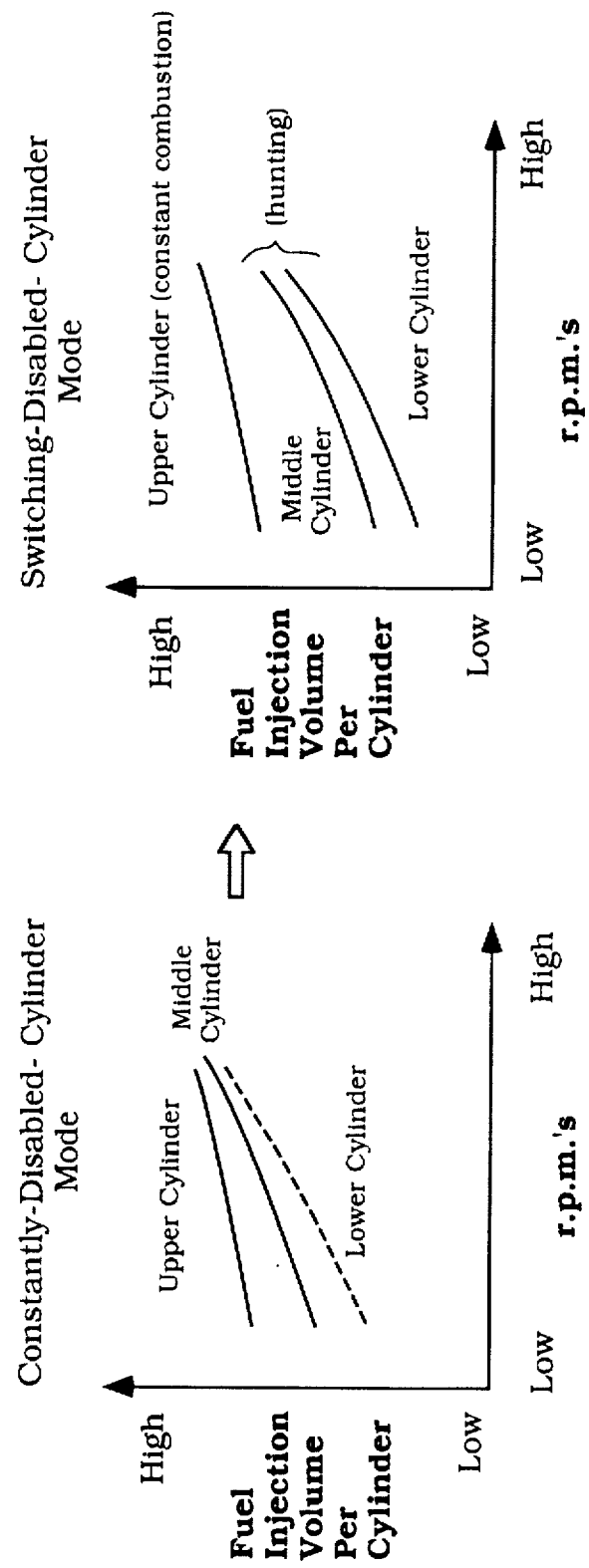
FIGS. 16A and 16B are schematic graphs showing the relationship between the fuel injection volume and the engine rpm's with a parameter of cylinders in the constantly-disabled-cylinder mode (FIG. 16A) and the switching-disabled-cylinder mode (FIG. 16B) of a second embodiment of the present invention.
Figures 17A, 17B:
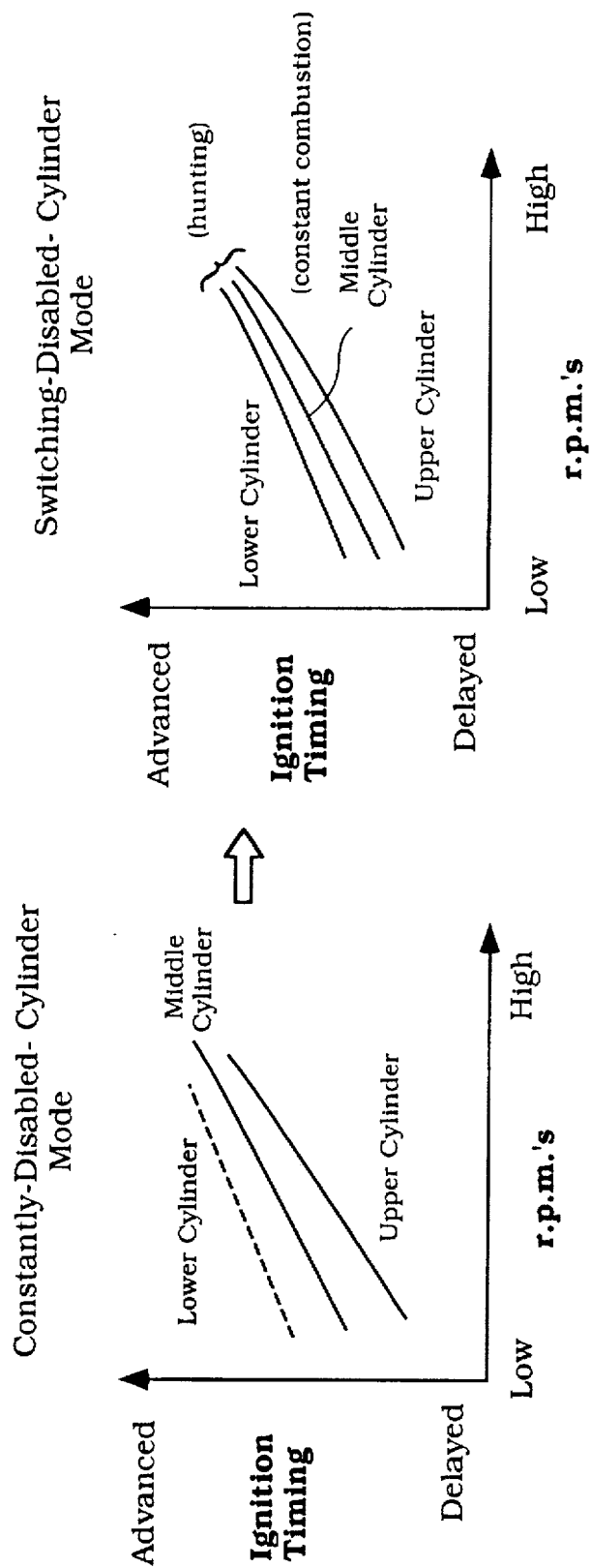
FIGS. 17A and 17B are schematic graphs showing the relationship between the timing of ignition and the engine rpm's with a parameter of cylinders in the constantly-disabled-cylinder mode (FIG. 17A) and the switching-disabled-cylinder (FIG. 17B) of a second embodiment of the present invention.

When the lower and middle cylinders are disabled alternately (FIG. 16B), the fuel injection volume in the constantly operating upper cylinder barely fluctuates while that in the middle and lower cylinders is significantly reduced, as compared with the case in which the lower cylinder is constantly disabled (FIG. 16A). Accordingly, for example, while the middle cylinder is in operation, the injected fuel remains in the intake channel of the lower cylinder, and thus, the fuel injection volume in the lower cylinder in the next cycle is significantly reduced.

With regard to the ignition timing, in the switching-disabled-cylinder mode (FIG. 17B), the ignition timing of the constantly operating upper cylinder is not substantially changed while the ignition timing of the middle and lower cylinders is delayed as a whole. Accordingly, although the middle and lower cylinders are ignited in each cycle so as to fully scavenge the gas in the cylinders, thereby increasing the fuel injection efficiency and the combustion intensity, it is possible to prevent the occurrence of imbalance of combustion intensity between the upper cylinder and the middle and lower cylinders.

Figure 19:
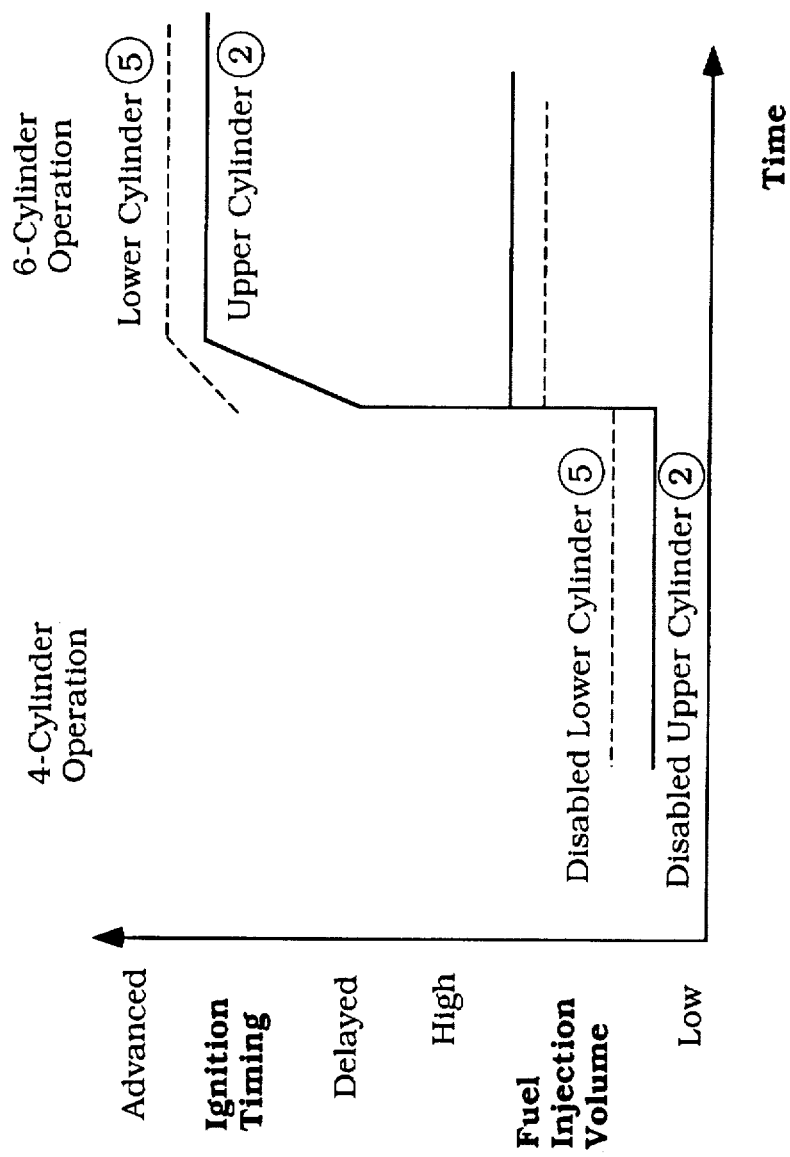
FIG. 19 is a schematic graph showing the relationship of the timing of ignition and the fuel injection volume vs. time-in-transition from four-cylinder operation to all-cylinder operation of the modified second embodiment of the present invention.

Embodiments other than the above embodiment, which is directed to the case in which four-cylinder operation is switched to six-cylinder operation via five-cylinder, is also operable. In FIG. 18 in which four-cylinde operation (upper cylinder #2 and lower cylinder #5 are disabled) is switched to six-cylinder operation (upper cylinder #2 and lower cylinder #5 are simultaneously resumed), timing control to delay the ignition timing is effective in mitigating impact or shock when resumed as shown in FIG. 19. In this case, it is preferred to reduce, as compared with in lower cylinder #5, the fuel injection volume in upper cylinder #2 that is likely to undergo intense combustion, or to set the ignition timing to be further delayed.

In addition to applying this principle to a two-cycle engine, it should be readily apparent that the same principle can be applied to four-cycle engines, although the invention has particular utility with two-cycle engines. Various other changes and modifications may be made without departing from the spirit and scope of the invention, as defined by the appended claims.

I claim:

1. A cylinder-disabling control system for a multi-cylinder engine V-type engine having plural cylinders on each of two banks, each of said banks having a plurality of exhaust ports for discharging exhaust products through an exhaust manifold to which each exhaust port is connected, said control system comprising an engine performance sensor for sensing the engine performance, an operation mode selector for selecting either a cylinder-disabling mode in which at least one but not all of said cylinders are disabled, or an all-cylinders-engaged mode in which all of said cylinders are operated depending on the engine performance and a resuming controller for resuming cylinder operation by resuming operation of said at least one disabled cylinder one at a time, when switching from the cylinder-disabling mode toward the all-cylinders-engaged mode and for controlling said engine during the resumption period in such a way as to minimize the perception of a change in engine speed by alternately resuming the operation of said at least one disabled cylinder between the two banks in sequence.

2. A cylinder-disabling control system for a multi-cylinder engine provided with a plurality of exhaust ports for discharging combustion products from said cylinders, an exhaust manifold to which each exhaust port is connected, said exhaust manifold having a common discharge end for several of the cylinders, said control system comprising an engine performance sensor for sensing the engine performance, an operation mode selector for selecting either a cylinder-disabling mode in which at least one but not all of said cylinders are disabled or an all-cylinders-engaged mode in which all of said cylinders are operated depending on the engine performance and a resuming controller for resuming cylinder operation by resuming operation of said at least one disabled cylinder one at a time, when switching from the cylinder-disabling mode toward the all-cylinders-engaged mode and for controlling said engine during the resumption period in such a way as to minimize the perception of a change in engine speed by resuming operation of said at least one disabled cylinder in sequence beginning from the disabled cylinder closest to the common discharge end of said exhaust manifold.

3. A cylinder-disabling control system for a water vehicle powered by for a multi-cylinder engine provided with a plurality of exhaust ports for discharging combustion products from said cylinders, an exhaust manifold to which each exhaust port is connected, said vehicle having at least one running movement condition where changes of the number of operating cylinders is less obvious to the operator of the vehicle than another running condition, said control system comprising an engine performance sensor for sensing the engine performance, an operation mode selector for selecting either a cylinder-disabling mode in which at least one but not all of said cylinders are disabled or an all-cylinders-engaged mode in which all of said cylinders are operated depending on the engine performance and a resuming controller for resuming cylinder operation by resuming operation of said at least one disabled cylinder one at a time, when switching from the cylinder-disabling mode toward the all-cylinders-engaged mode and for controlling said engine during the resumption period in such a way as to minimize the perception of a change in engine speed by resuming at least partial operation of said at least one disabled cylinder when the vehicle is in the at least one running movement condition.

4. A cylinder-disabling control system according to claim 3, wherein the at least one running movement condition is a planing condition.

5. A cylinder-disabling control system for a multi-cylinder engine, said control system comprising: an engine performance sensor for sensing the engine performance; an operation mode selector for selecting either a cylinder-disabling mode in which at least one but not all of the cylinders are disabled, or an all-cylinders-engaged mode in which all of the cylinders are operated, depending on the engine performance; and an engine revolution controller for controlling engine rpm's in such a way that the rpm's of the engine immediately after the number of operated cylinders is increased while maintaining a constant throttle angle, are lower than that immediately before the number of operated cylinders is increased.

6. A cylinder-disabling control system for a multi-cylinder engine, said control system comprising: an engine performance sensor for sensing the engine performance; an operation mode selector for selecting either a cylinder-disabling mode in which ignition of at least one but not all of the cylinders is discontinued while maintaining the fuel supply thereto, or an all-cylinders-engaged mode in which all of the cylinders are operated, depending on the engine performance; and a fuel supply amount controller for controlling the amount of supplied fuel in such a way that the amount of supplied fuel at idle rpm's of said at least one disabled cylinder during the cylinder-disabling mode is greater than that immediately before the number of operated cylinders is increased.

7. A cylinder-disabling control system according to claim 6, wherein said fuel supply amount controller is a controller which further controls the amount of supplied fuel in such a way as to reduce gradually the amount of supplied fuel to an amount supplied immediately before the number of operated cylinders is increased in response to an increase in rpm's of the engine.

8. A cylinder-disabling control system according to claim 7, wherein the fuel is supplied by a fuel injector.

9. A cylinder-disabling control system according to claim 6, wherein the fuel is supplied by a fuel injector.

10. A cylinder-disabling control system for a multi-cylinder engine, said control system comprising: an engine performance sensor for sensing the engine performance; an operation mode selector for selecting either a cylinder-disabling mode in which at least one but not all of the cylinders are disabled, or an all-cylinders-engaged mode in which all of the cylinders are operated, depending on the engine performance; a throttle-opening sensor for sensing the throttle-opening; an engine revolution sensor for sensing the engine rpm's; a throttle-opening-dependent controller for controlling operation of the cylinders in such a way that at least one but not all of the cylinders are disabled when the throttle-opening is smaller than a first throttle opening, and operation of at least one of the disabled cylinder(s) is resumed when the throttle-opening is over a second throttle-opening greater than the first throttle-opening; an engine revolution-dependent controller for controlling operation of the cylinders in such a way that at least one but not all of the cylinders are disabled when the engine rpm's are lower than first engine rpm's, and operation of at least one of the disabled cylinder(s) is resumed when the engine rpm's are over second engine rpm's higher than the first engine rpm's; and a selecting switch for selecting either the engine revolution-dependent controller or the throttle-opening-dependent controller, wherein hysteresis rpm's that are the difference between the first and second rpm's are set greater than hysteresis rpm's that are the difference between the engine rpm's corresponding to the first throttle-opening and to the second throttle-opening.

11. A cylinder-disabling control system for a multi-cylinder engine, said control system comprising an engine performance sensor for sensing the engine performance, an operation mode selector for selecting either a cylinder-disabling mode in which at least one but not all of the cylinders are disabled or an all-cylinders-engaged mode in which all of the cylinders are operated in response to the engine performance as determined by said engine performance sensor and a disabled cylinder designator for designating the specific at least one of the cylinders to be disabled, said disabled cylinder designator being operative so that the specific cylinder disabled is different from the specific cylinder previously disabled cylinder when the cylinder-disabling mode is again resumed after a period when the all-cylinders-engaged mode has been operated.

12. A method for cylinder-disabling control for a multi-cylinder V-type engine having plural cylinders on each of two banks each of which has at least one exhaust port for discharging combustion products, said exhaust ports being connected to respective exhaust manifolds, said method comprising the steps of sensing the engine performance, selecting either a cylinder-disabling mode in which at least one but not all of the cylinders are disabled or an all-cylinders-engaged mode in which all of the cylinders are operated depending on the sensed engine performance and resuming cylinder operation by resuming operation of said at least one disabled cylinder one at a time, and when switching from the cylinder-disabling mode toward the all-cylinders-engaged mode controlling said engine during the resumption period in such a way as to minimize the perception of a change in engine speed by alternately resuming the operation of said at least one disabled cylinder in sequence between the two banks alternately.

13. A method for cylinder-disabling control for a multi-cylinder engine having at least one exhaust port for each cylinder for the discharge of combustion products therefrom and an exhaust manifold to which each exhaust port is connected, said exhaust manifold having a common discharge end for several of the cylinders, said method comprising the steps of sensing the engine performance, selecting either a cylinder-disabling mode in which at least one but not all of the cylinders are disabled or an all-cylinders-engaged mode in which all of the cylinders are operated depending on the sensed engine performance and resuming cylinder operation by resuming operation of said at least one disabled cylinder one at a time, and when switching from the cylinder-disabling mode toward the all-cylinders-engaged mode resuming operation of said at least one disabled cylinder in sequence beginning from the most closest to the common discharge end.

14. A method for cylinder-disabling control for a multi-cylinder engine for a powering a water vehicle having at least one running movement condition where changes of the number of operating cylinders is less obvious to the operator of the vehicle than another running condition, said method comprising the steps of sensing the engine performance, selecting either a cylinder-disabling mode in which at least one but not all of the cylinders are disabled or an all-cylinders-engaged mode in which all of the cylinders are operated depending on the sensed engine performance and resuming cylinder operation by resuming operation of said at least one disabled cylinder one at a time when the vehicle is in the at least one running movement condition.

15. A cylinder-disabling control method according to claim 14, wherein the at least one running movement condition is a planing condition.

16. A method for cylinder-disabling control for a multi-cylinder engine, said method comprising the steps of: sensing the engine performance; selecting either a cylinder-disabling mode in which at least one but not all of the cylinders are disabled, or an all-cylinders-engaged mode in which all of the cylinders are operated, depending on the engine performance; and controlling engine rpm's in such a way that the rpm's of the engine immediately after the number of operated cylinders is increased for a constant throttle angle, are lower than that immediately before the number of operated cylinders is increased.

17. A method for cylinder-disabling control for a multi-cylinder engine, said method comprising the steps of: sensing the engine performance; selecting either a cylinder-disabling mode in which ignition of at least one but not all of the cylinders is discontinued while maintaining the fuel supply thereto, or an all-cylinders-engaged mode in which all of the cylinders are operated, depending on the engine performance; and controlling the amount of fuel supplied in such a way that the amount of supplied fuel at idle rpm's of said at least one disabled cylinder during the cylinder-disabling mode is greater than that immediately before the number of operated cylinders is increased.

18. A method according to claim 17, wherein, in the step of controlling fuel supply amount, the amount of supplied fuel is further controlled in such a way as to reduce gradually the amount of supplied fuel to the amount supplied immediately before the number of operated cylinders is increased in response to an increase in rpm's of the engine.

19. A cylinder-disabling control method according to claim 18, wherein the fuel is supplied by a fuel injector.

20. A cylinder-disabling control method according to claim 17, wherein the fuel is supplied by a fuel injector.

21. A method for cylinder-disabling control for a multi-cylinder engine, said method comprising the steps of: sensing the engine performance; selecting either a cylinder-disabling mode in which at least one but not all of the cylinders are disabled, or an all-cylinders-engaged mode in which all of the cylinders are operated, depending on the engine performance; sensing the throttle-opening; controlling operation of the cylinders in such a way that at least one but not all of the cylinders are disabled when the throttle-opening is smaller than a first throttle opening, and operation of at least one of the disabled cylinder(s) is resumed when the a second throttle-opening is greater than the first throttle-opening, sensing the engine rpm's; controlling operation of the cylinders in such a way that at least one but not all of the cylinders are disabled when the engine rpm's are lower than first engine rpm's, and operation of at least one of the disabled cylinder(s) is resumed when the engine rpm's are over second engine rpm's higher than the first engine rpm's; and selecting either the engine control or the throttle-opening-dependent control, wherein hysteresis rpm's that are the difference between the first and second rpm's are set greater than hysteresis rpm's that are the difference between the engine rpm's corresponding to the first throttle-opening and to the second throttle-opening.

* * * * *

UNITED STATES PATENT AND TRADEMARK OFFICE
CERTIFICATE OF CORRECTION

PATENT NO. : 5,797,371

DATED : August 25, 1998

INVENTOR(S) : Kimihiro Nonaka

It is certified that error appears in the above-identified patent and that said Letters Patent is hereby corrected as shown below:

ON THE TITLE PAGE

After item [22], please insert item

--[30] Foreign Application Priority Data
   March 9, 1995 [JP]  Japan.................Hei 7-49586 --.

Signed and Sealed this

Eighteenth Day of April, 2000

Attest:

Q. TODD DICKINSON

Attesting Officer          Director of Patents and Trademarks